(12) United States Patent  
Aident et al.

(10) Patent No.: US 8,795,405 B1  
(45) Date of Patent: Aug. 5, 2014

(54) BENEFICIAL USE OF CARBON

(75) Inventors: Michael L. Aident, Knoxville, TN (US); Randall Paul Moore, Powell, TN (US); Bobby I. T. Chen, Bowling Green, KY (US); Kevin Brent Jackson, Knoxville, TN (US)

(73) Assignee: Shaw Intellectual Property Holdings, LLC, Baton Rouge, LA (US)

( * ) Notice: Subject to any disclaimer, the term of this patent is extended or adjusted under 35 U.S.C. 154(b) by 495 days.

(21) Appl. No.: 12/796,312

(22) Filed: Jun. 8, 2010

Related U.S. Application Data

(60) Provisional application No. 61/185,053, filed on Jun. 8, 2009.

(51) Int. Cl.
*C05C 9/00* (2006.01)
*C01C 1/26* (2006.01)

(52) U.S. Cl.
USPC ............ 71/28; 423/220; 423/234; 423/364; 423/420

(58) Field of Classification Search
USPC ............ 423/419.1, 420, 220, 234, 659, 364; 34/329–352; 71/28
See application file for complete search history.

(56) References Cited

U.S. PATENT DOCUMENTS

| | | | |
|---|---|---|---|
| 1,492,661 A | | 5/1924 | Arnold |
| 1,766,705 A | * | 6/1930 | Dehnel ..................... 423/265 |
| 1,870,131 A | * | 8/1932 | Meier ........................ 71/61 |
| 1,897,725 A | * | 2/1933 | Schunck et al. ........... 423/419.1 |
| 1,909,757 A | * | 5/1933 | Coxon ....................... 423/420 |
| 2,043,109 A | | 6/1936 | McKee et al. |
| 2,889,197 A | | 6/1959 | Baumann |
| 3,197,302 A | * | 7/1965 | MacBride ................... 71/37 |
| 3,310,367 A | * | 3/1967 | Mavrovic .................. 423/420 |
| 4,250,150 A | * | 2/1981 | Karwat et al. ............. 423/226 |
| 4,329,320 A | | 5/1982 | Vydra et al. |
| 4,567,294 A | | 1/1986 | Dressel et al. |
| 5,270,023 A | | 12/1993 | May et al. |
| 5,422,087 A | * | 6/1995 | Lajoie ........................ 423/267 |
| 5,831,123 A | * | 11/1998 | Gergely et al. ............ 562/584 |
| 6,180,074 B1 | | 1/2001 | Fourcot et al. |
| 6,280,695 B1 | | 8/2001 | Lissianski et al. |
| 6,447,437 B1 | * | 9/2002 | Lee et al. .................. 588/250 |
| 6,569,395 B1 | | 5/2003 | Fujimura et al. |
| 6,729,040 B2 | * | 5/2004 | Mehmandoust ............ 34/443 |
| 7,132,090 B2 | * | 11/2006 | Dziedzic et al. .......... 423/230 |
| 7,255,842 B1 | | 8/2007 | Yeh et al. |
| 8,287,830 B2 | * | 10/2012 | Liu et al. ................... 423/234 |
| 8,308,849 B2 | * | 11/2012 | Gal ............................ 95/187 |
| 8,309,047 B2 | * | 11/2012 | Black et al. ............... 423/234 |
| 8,491,858 B2 | * | 7/2013 | Seeker et al. ............. 423/105 |
| 8,608,821 B2 | * | 12/2013 | Canari ........................ 71/34 |
| 2005/0265911 A1 | * | 12/2005 | Yuan .......................... 423/220 |

(Continued)

FOREIGN PATENT DOCUMENTS

DE   3415140 A1   10/1985

OTHER PUBLICATIONS

UK 2008-M51410, Derwent Information Ltd.

*Primary Examiner* — Wayne Langel
(74) *Attorney, Agent, or Firm* — Kean Miller LLP

(57) ABSTRACT

Devices and methods for reacting carbon dioxide with ammonia to produce an ammonium bicarbonate containing product are disclosed. Further disclosed are methods and devices pertaining to the handling of ammonia, ammonium bicarbonate products, and waste products associated with that production.

3 Claims, 10 Drawing Sheets

(56) References Cited

U.S. PATENT DOCUMENTS

| | | |
|---|---|---|
| 2008/0176301 A1 | 7/2008 | Granda et al. |
| 2008/0302722 A1 | 12/2008 | Burke |
| 2010/0196244 A1* | 8/2010 | Grauer et al. ................ 423/423 |
| 2011/0070136 A1* | 3/2011 | Gal et al. ...................... 423/228 |

* cited by examiner

BENEFICIAL USE OF CARBON

This application claims the benefit of U.S. Provisional Patent Application No. 61/185,053 filed Jun. 8, 2009 entitled "Carbon Capture System."

Disclosed herein are embodiments relating to methods and products associated with the beneficial use of carbon. Embodiments taught herein have utility in the reduction of carbon dioxide releases to the atmosphere. Among the uses of the methods and products disclosed herein is the production of ammonium bicarbonate products. Ammonia reacts with carbon dioxide to make ammonium bicarbonate based on the following reaction.

$$NH_3 + H_2O + CO_2 \rightarrow NH_4HCO_3$$

Methods of beneficially using carbon described herein may, for example, comprise contacting carbon dioxide with a carbon delivery compound in a first aqueous solution; precipitating a soil amendment from the first aqueous solution; separating a solids rich fraction containing at least a fraction of the soil amendment from a solids lean fraction; and adding at least a portion of the solids lean fraction to the first aqueous solution. Soil amendments may include, for example, ammonium bicarbonate. In a related example, a portion of the carbon delivery compound may be evolved from the first aqueous solution, captured in a pollution control aqueous solution, concentrated, and then returned to the first aqueous solution. In a related example, the carbon delivery compound is an amine and in a further related example, the amine is ammonia. In a related example, the soil amendment is contacted with a drying composition and is dewatered. Drying compositions are compositions that aid in the removal of water such as through evaporation of water containing a drying composition. Drying compositions may include for example, water soluble alcohols.

Other methods of beneficially using carbon described herein may, for example, comprise contacting carbon dioxide with an amine in a first aqueous solution; precipitating a precipitate containing a substantial number of both carbon atoms and nitrogen atoms from the first aqueous solution; separating a solids rich fraction containing at least a fraction of the precipitate containing a substantial number of both carbon atoms and nitrogen atoms from a solids lean fraction; and adding at least a portion of the solids lean fraction to the first aqueous solution. In a related example, amine may be supplied by an amine supply line. In a further related example, the amine may be ammonia. In a further related example, the precipitate containing a substantial number of both carbon atoms and nitrogen atoms may contain both ammonium bicarbonate and ammonium carbonate. In a further related example, at least a first portion of the ammonium bicarbonate from the solids rich fraction may be contacted with a water soluble alcohol and a second portion of the ammonium bicarbonate from the solids rich fraction may be dewatered in such a way that the first portion of the ammonium bicarbonate from the solids rich fraction and the second portion of the ammonium bicarbonate from the solids rich fraction have some ammonium bicarbonate in common. In four further related examples, at a point prior to separating the solids rich fraction, the ammonium bicarbonate in the solids rich fraction may be greater than 40 weight percent of the total of ammonium bicarbonate and ammonium carbonate, the weight percent of ammonium bicarbonate may be greater than 70 percent, the weight percent of ammonium bicarbonate may be greater than 90 percent, and the weight percent may be greater than 95%. In another related example, carbon dioxide is absorbed into the aqueous solution and substantially all of the nitrogen from the ammonia supply line and substantially all of the carbon from the carbon dioxide absorbed may be converted into a solid ammonium bicarbonate product. In another related example, urea may be applied to the solid ammonium bicarbonate product to produce a final product. In another example, carbon dioxide may be either a product or a byproduct of an industrial process. In another example, carbon dioxide may be delivered from a combustion process. In another example, the carbon dioxide may be delivered from a biological process. In another example, the precipitate containing a substantial number of both carbon atoms and nitrogen atoms may be contacted with a water soluble alcohol or a water soluble ketone. In another example, a solid ammonium bicarbonate product is produced and a stabilizing agent is applied to the solid ammonium bicarbonate product and in a related example that stabilizing agent is urea. In another example, acid may be mixed with the precipitate causing ammonium carbonate to convert to ammonium bicarbonate. In another example, the final product may be dried to less than 15% water by weight. In another example, water soluble alcohol may be separated from the precipitate, treated, and used again to treat additional precipitate. Compositions of matter described herein may, for example, be the product of any of the methods described herein.

Methods of producing a product containing ammonium bicarbonate described herein may, for example, comprise precipitating ammonium bicarbonate from an aqueous solution comprising ammonia and dissolved carbon dioxide creating a slurry; removing a solids lean fraction from the slurry; dewatering the ammonium bicarbonate by contacting the ammonium bicarbonate with a volatile, water miscible liquid in which ammonium bicarbonate has insubstantial solubility; and drying the ammonium bicarbonate.

Compositions of matter described herein may, for example, comprise ammonium bicarbonate and have trace amounts of combustion products, the combustion products being characteristic of the ammonium bicarbonate being derived from aqueous ammonia treatment of flue gas from the burning of a fossil fuel and the combustion products being characteristic of the ammonium bicarbonate having been washed with a water soluble alcohol.

DETAILED DESCRIPTION

Flue Gas Treatment

An embodiment of the present invention that removes and binds carbon dioxide ($CO_2$) from a gas utilizes ammonia ($NH_3$) to react with the $CO_2$ to form solid ammonium bicarbonate, a commercial agricultural fertilizer. In that embodiment, the ammonium bicarbonate solids are separated from the mother liquor, washed, dried and then packaged for sale as a commercial fertilizer. In an embodiment of the invention, a liquid slurry product is produced. In that case, the thickened and concentrated slurry would represent the salable product. The embodiment combines unit operations into an energy efficient process that has been optimized for $CO_2$ capture from a gaseous stream containing $CO_2$. This invention has potential use in removing carbon dioxide from sources that produce $CO_2$ as a product, bi-product, or waste gas. Gases that contain $CO_2$ and may be treated by embodiments of this invention are sometimes referred to herein as source gases. Embodiments of this invention can be coupled to processes that emit $CO_2$ at varying concentrations. Based on the disclosure herein, alternate designs can be built and operated to remove different quantities and percentages of carbon dioxide from the source gas. In various embodiments of the invention, carbon dioxide removal efficiency from a source gas can range from 10% to over 90%. Certain embodiments of the invention are suitable for accepting source gases from combustion reactions having $CO_2$ concentrations ranging from approximately 7% to approximately 15% carbon dioxide. Various embodiments of the invention that are disclosed herein may be paired with a variety of combustion equipment that emits gases containing $CO_2$, including boilers, industrial furnaces, electric power plants, and industrial heaters. Further, embodiments of the invention may be paired with non-combustion processes such as ethanol production, and related processes such as fermenters and bakeries that produce a waste gas that contains substantial quantities of carbon dioxide. Certain embodiments described herein pass impurities associated with certain $CO_2$ sources such as sulfur oxides, nitrogen oxides, particulate matter, hydrogen sulfide, trace heavy metals, oxygen, carbon monoxide, and other trace organic chemicals from the source gas to the product rather than allowing those impurities to accumulate in the system.

Figure 5:
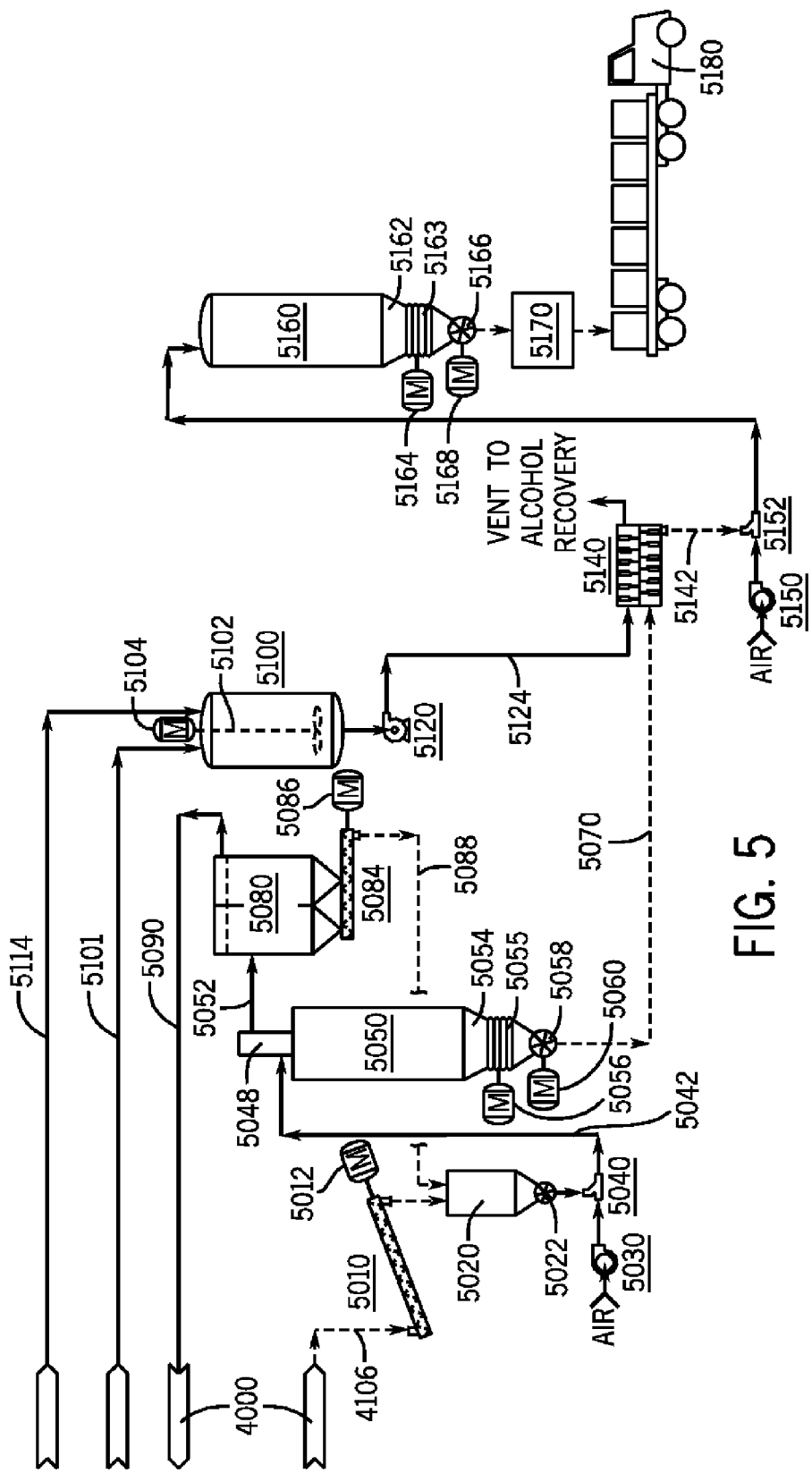
FIG. 5 shows a process flow diagram of the packaging system.
Figure 6:
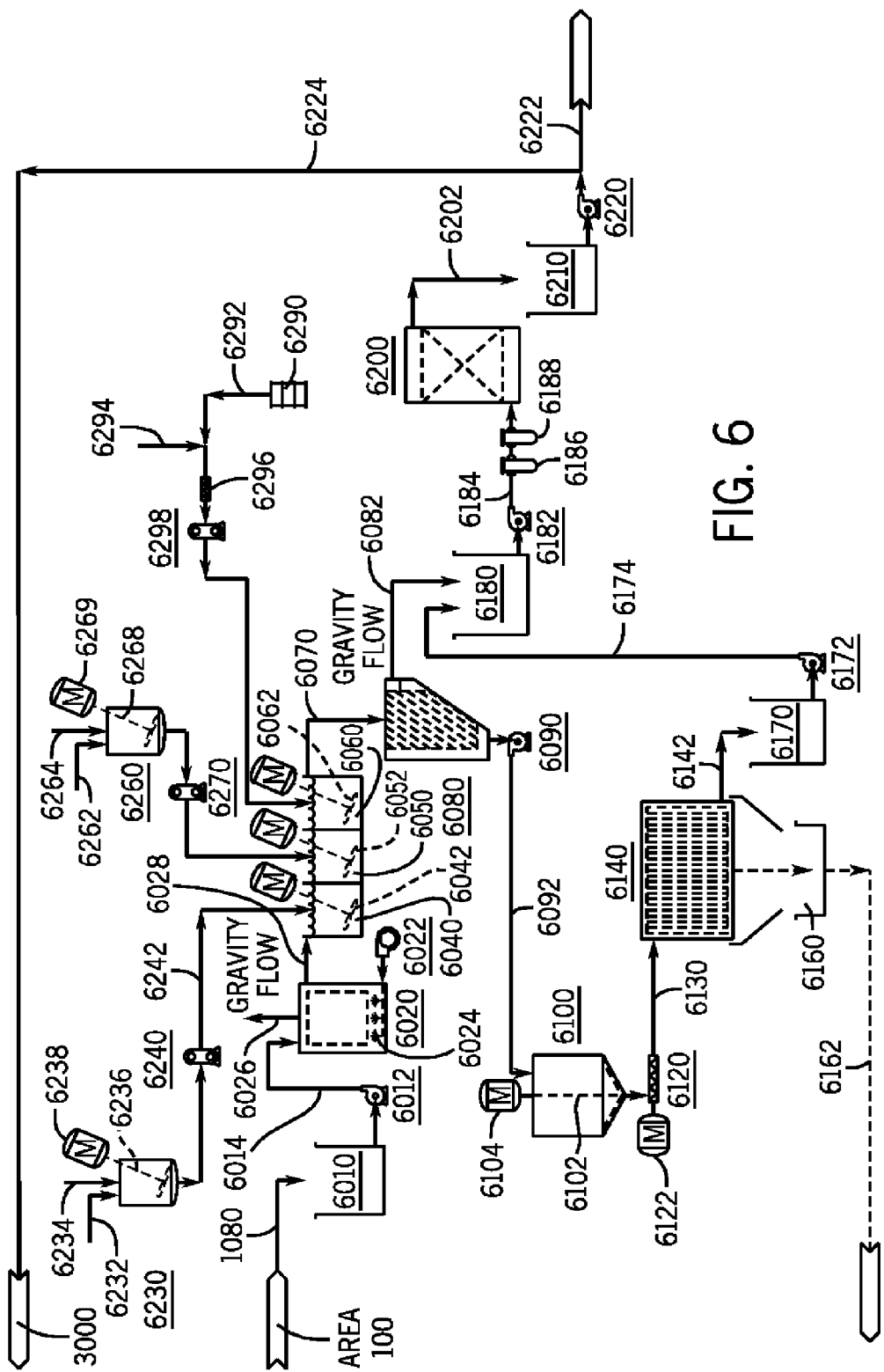
FIG. 6 shows a process flow diagram of the waste treatment system.
Figure 7:
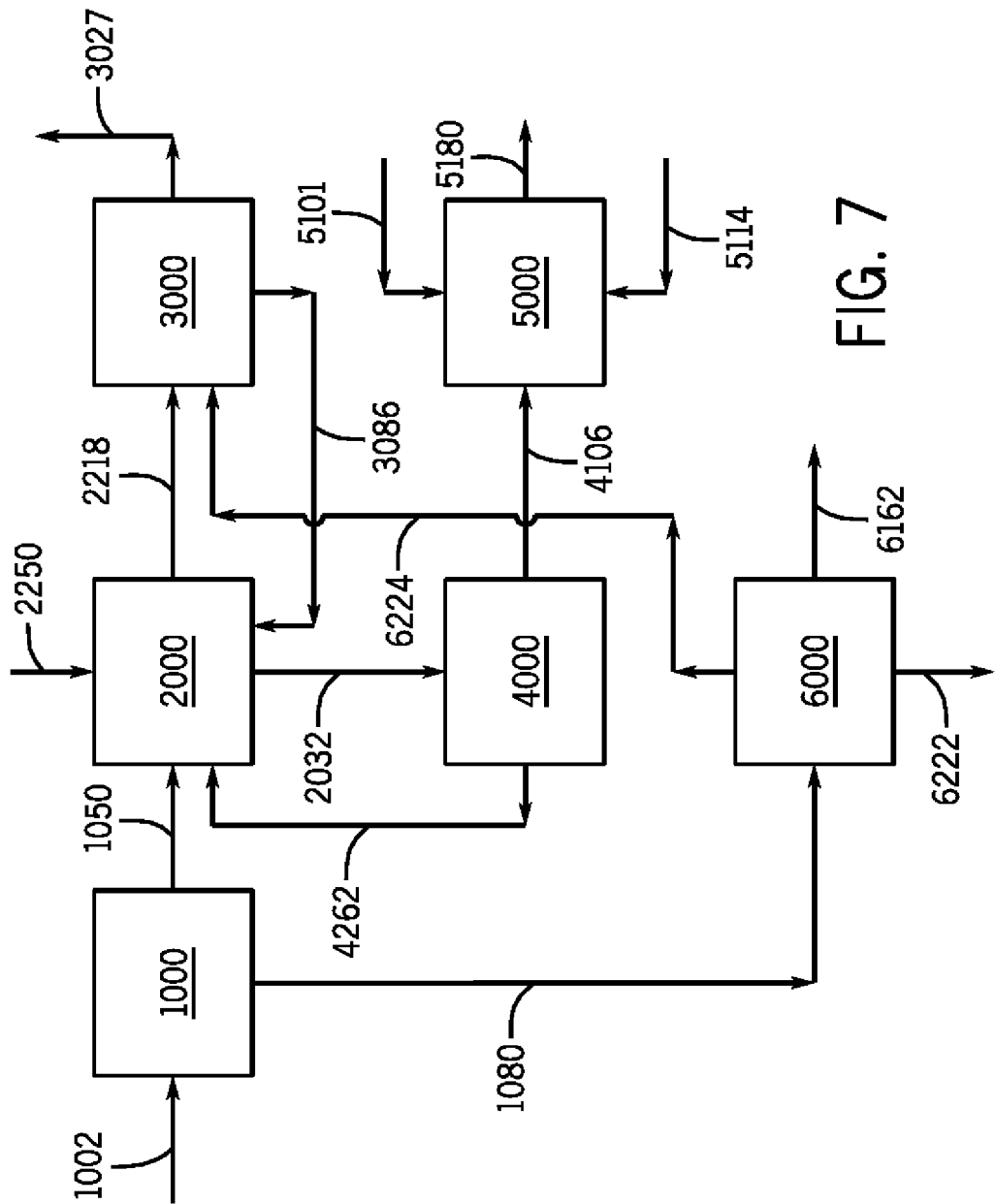
FIG. 7 shows an overview of the carbon capture process in block flow diagram format as used in the capture of carbon dioxide from a combustion process source gas.

FIGS. 1-7 illustrate an embodiment of the invention that is a process for capturing and binding carbon dioxide from a combustion process flue gas source with FIG. 7 representing a summary of FIGS. 1-6. Referring now to FIG. 7 of the drawings, carbon dioxide in the Source Gas Feed 1002 travels to Source Gas Cooler System 1000. Not all applications will require the use of a source gas cooler. The source gas cooler may be used in applications where the source gas stream is at an elevated temperature and the gas is unsaturated relative to moisture and therefore requires a degree of cooling and humidification prior to treatment. In an embodiment of the invention, the source gas is cooled to the adiabatic saturation temperature before being treated to remove the carbon dioxide and form the fertilizer because ammonium bicarbonate decomposes at higher temperatures. Exiting the Source Gas Cooler System 1000 is the Feed Line To The $CO_2$ Capture System 1050. The Feed Line To The $CO_2$ Capture System 1050 provides cool and humidified source gas to the $CO_2$ Capture System 2000. The Source Gas Cooling Tower Blow-Down Line 1080 carries cooling tower blow down water to the Wastewater Treatment System 6000. Ammonia Supply Line 2250 supplies ammonia to the $CO_2$ Capture System 2000 and individual lines not shown in FIG. 7 including Carbon Capture Spray Tower Ammonia Make Up Line 2064, Bubble Cap Tower Ammonia Makeup Line 2136, and Carbon Capture Packed Tower Ammonia Make Up Line 2226. In an embodiment of the invention, anhydrous ammonia is used as the ammonia source. In an alternate embodiment, an ammonium hydroxide solution is used as the ammonia source. Selection of the source of ammonia may be based on multiple criteria including process economics. The Carbon Capture Centrifuge Slurry Discharge 2032 carries a slurry of ammonium bicarbonate from Carbon Capture Centrifuge 2030 to the Slurry Dewatering And Drying System 4000. Centrate is recycled from the Slurry Dewatering and Drying System 4000 to the $CO_2$ Capture System 2000 by Dewatering Primary Stripper Centrate Tank Pump Discharge Line 4262. Carbon Capture Packed Tower Gas Discharge 2218 carries $CO_2$ lean flue gas to Ammonia Recovery System 3000. The treated source gas leaves the Ammonia Recovery System 3000 via the Line To Source Gas Exhaust Stack 3027. Ammonia is returned to the $CO_2$ Capture System 2000 via the Stripper Gas Effluent Line 3086. In the embodiment shown in FIGS. 2A, 2B, 2C, and 4, Slurry Dewatering and Drying System 4000 includes ammonium bicarbonate crystallization, thickening, concentration, and drying prior to transfer to Product Coating and Packaging System 5000 via Dryer Discharge Line 4106. Product Coating and Packaging System 5000 enriches the ammonium bicarbonate with urea from Urea Supply Line 5101 for packaging and delivery by Delivery System 5180. Wastewater Treatment System 6000 treats the blowdown from Source Gas Cooling Tower Blow-Down Line 1080 discharging liquid waste via Wastewater Treatment Treated Effluent Storage Tank Transfer Pump Line To Outfall 6222 and solid waste via Filter Cake Portable Bin Disposal Travel Path 6162. A portion of the liquid effluent from Wastewater Treatment System 6000 is returned to Ammonia Recovery System 3000 via Wastewater Treatment Treated Effluent Storage Tank Transfer Pump Line To Absorber System 6224.

Figure 1:
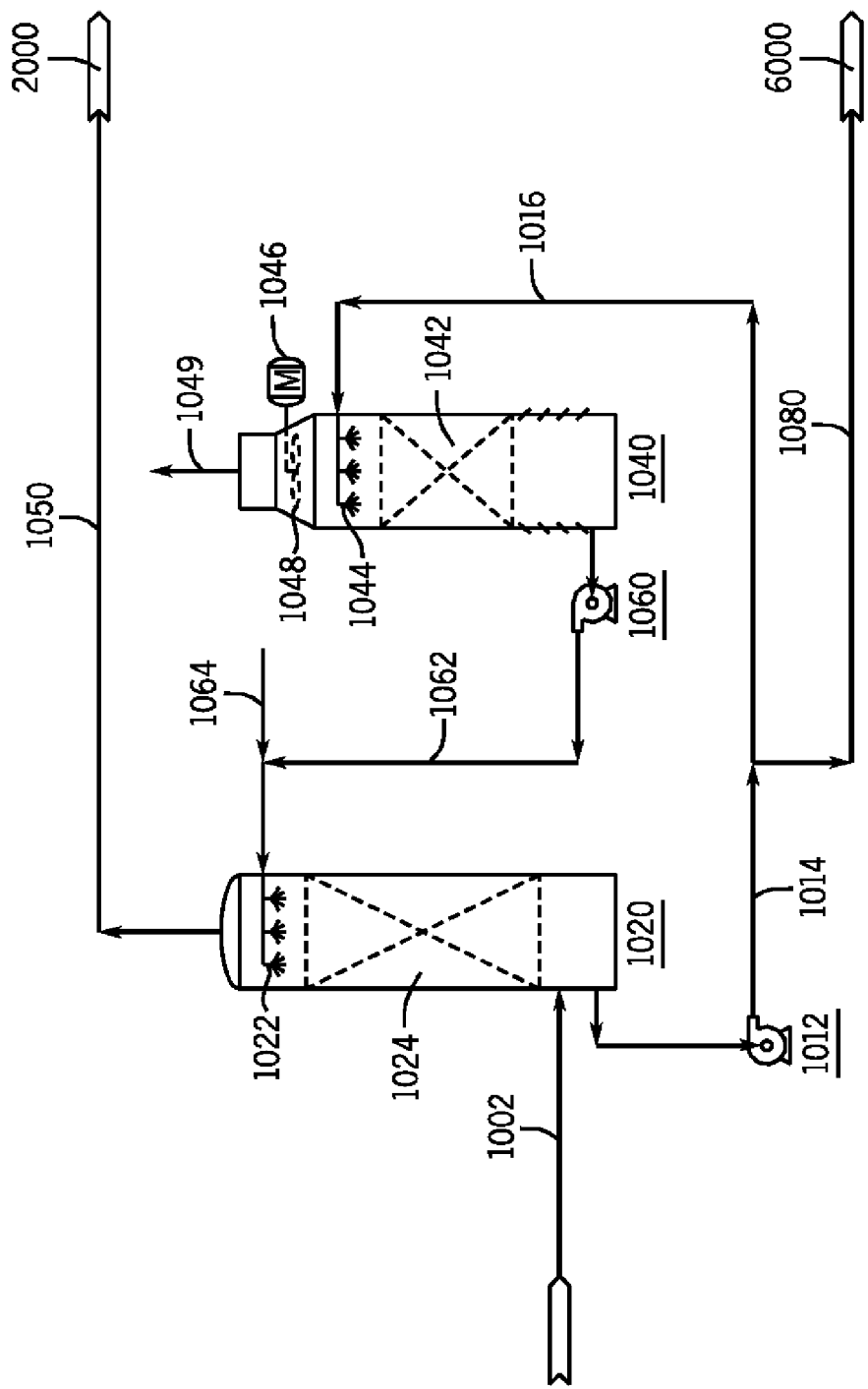
FIG. 1 shows a process flow diagram of the source gas cooler system.

Referring now to FIG. 1 of the drawings, Source Gas Feed 1002 enters Source Gas Cooler 1020 which is a direct contact counter current packed bed cooler and is cooled by direct contact with re-circulated cooled water from Source Gas Cooler Nozzles 1022. Cooled source gas exits the Source Gas Cooler 1020 via the Feed Line To $CO_2$ Capture System 1050. The gas-liquid contact surface area is enhanced by Source Gas Cooler Fill 1024. Source Gas Cooler Pump 1012 pumps the heated liquid effluent of Source Gas Cooler 1020 to Source Gas Cooling Tower 1040 via Source Gas Cooler Pump Discharge Line 1014 and Source Gas Cooling Tower Feed Line 1016. A portion of the material from Source Gas Cooler Pump Discharge Line 1014 is removed as blow-down water via Source Gas Cooling Tower Blow-Down Line 1080. The blow-down water will be in large part derived from the condensed water from the source gas but will also include dissolved and suspended solids that were captured from the source gas in Source Gas Cooler 1020. These solids could include both sodium and calcium salts as well as particulate matter. Source Gas Cooling Tower 1040 contains Source Gas Cooling Tower Nozzles 1044 which are fed from Source Gas Cooling Tower Feed Line 1016; Source Gas Cooling Tower Fill 1042; and Source Gas Cooling Tower Fan 1048. Source Gas Cooling Tower Fan 1048 is powered by Source Gas Cooling Tower Fan Motor 1046. Air and mist exit from Source Gas Cooling Tower 1040 via Cooling Tower Exhaust 1049 exhausting the heat absorbed by the water. Source Gas Cooler Recirculation Pump 1060 supplies liquid to Source Gas Cooler Nozzles 1022 via Source Gas Cooler Recirculation Pump Discharge Line 1062. Makeup water is added to the Gas Cooler Recirculation Pump Discharge Line 1062 via Source Gas Cooler Make Up Water Line 1064. The pH of the recirculated cooling water is monitored and controlled with the addition of sulfuric acid to insure that the Source Gas Cooler 1020 does not foul with calcium or other carbonate scales.

In an embodiment of the invention, the source gas is cooled to less than 135° F. before it exits the top of Source Gas Cooler 1020. Prior to treatment by Source Gas Cooler 1020 the source gas may have a wide range of temperatures. In another embodiment of the invention, the source gas is cooled to approximately 95° F. by the cooled water stream before it exits the top of Source Gas Cooler 1020. In yet another embodiment of the invention, the source gas that exits the source gas cooler is saturated with water vapor. Approximately 30% of the water vapor that enters Source Gas Cooler 1020 may be condensed within Source Gas Cooler 1020. The amount of water condensed in the source gas cooler is dependent on factors including the composition, temperature and relative humidity of the untreated source gas. Certain embodiments of the invention include volume reductions of approximately 20% of the source gas in Source Gas Cooler 1020.

Figure 2A:
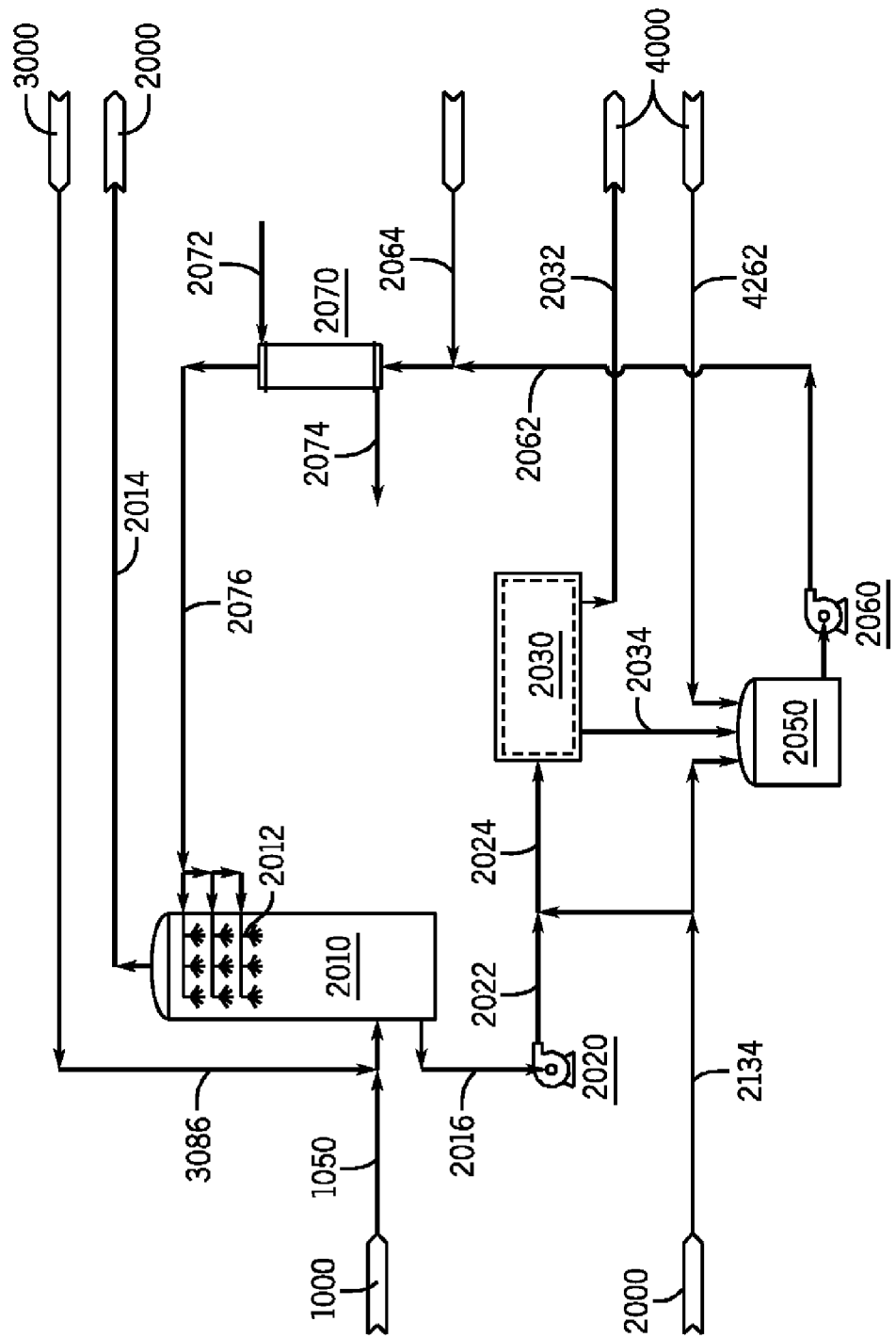
FIG. 2A shows a process flow diagram of the carbon capture spray tower system.

Referring now to FIG. 2A of the drawings, $CO_2$ rich source gas enters the Carbon Capture Spray Tower 2010 via Feed Line To $CO_2$ Capture System 1050. In an embodiment of the invention, the motive force for the process is a fan located after Source Gas Cooler 1020 in Feed Line To $CO_2$ Capture System 1050. This fan is not shown in the FIG. 2A. Alternate embodiments of the invention may include other fan placements within the process. Selection of fan placement depends on factors including the initial pressure of the incoming source gas. Carbon Capture Spray Tower 2010 contains an ammonia scrubbing solution which reacts with the carbon dioxide in the source gas. The selection of the specific mass transfer devices and media to scrub the carbon dioxide depends on the application. In certain embodiments where low recoveries are required, a spray tower may be selected. In certain embodiments where a higher level of recovery is needed, packed towers or bubble trays may be selected. In the spray tower application, Carbon Capture Spray Tower Nozzles 2012 create the liquid gas contact surface area for the carbon dioxide scrubbing by atomizing the scrubbing solution comprising water, ammonia, ammonium bicarbonate, and optionally, ammonium carbonate into the source gas Ammonium bicarbonate is formed in Carbon Capture Spray Tower 2010 by the reaction of carbon dioxide with ammonia. The reaction of carbon dioxide with ammonia is an exothermic reaction. In an embodiment of the invention, the reaction is carried out at a pH of between 6 and 10. In another embodiment of the invention, the reaction is carried out at a pH of approximately 8.2. Ammonium bicarbonate yield is maximized at a pH value near 8.2. As the scrubbing solution is already saturated with ammonium bicarbonate, any additional carbon dioxide that reacts with ammonia to form ammonium bicarbonate will result in a super saturated solution. The excess ammonium bicarbonate will precipitate onto solids in the spray tower scrubber solution. The scrubbing solution collects in the bottom of the spray tower from which a portion of the solids are removed from the scrubber solution via subsequent processing steps. The treated scrubbing solution is recycled back to the top of the spray tower for use to scrub additional carbon dioxide. Source gas having reduced levels of carbon dioxide exits Carbon Capture Spray Tower 2010 via Carbon Capture Spray Tower Gas Discharge 2014. Liquid is discharged from the bottom of the Carbon Capture Spray Tower 2010 to Carbon Capture Spray Tower Pump 2020 via Spray Tower Liquid Discharge 2016. Liquid effluent of Carbon Capture Spray Tower 2010 is delivered to Carbon Capture Centrifuge 2030 via Carbon Capture Spray Tower Pump Discharge 2022 and Carbon Capture Centrifuge Feed Line 2024. The ammonium bicarbonate solids separation technology depicted in the figures utilizes centrifuges to concentrate the solids from the liquid stream. In other embodiments, alternate technologies could be used to enhance the ammonium bicarbonate solids separation such as gravity thickeners, hydroclones, and filters. The selection of the technology used to concentrate the solids depends on the specific application and the scale of the process. Certain embodiments which process ammonium bicarbonate at a high rate will utilize centrifuge separation. Certain other embodiments which process ammonium bicarbonate at relatively low rates may utilize other devices such as filters, evaporators, and vacuum systems. Embodiments of the invention also include pre-filtration gravity settlers that may be used prior to Carbon Capture Centrifuge 2030 to promote larger ammonium bicarbonate crystal growth. In an embodiment of the invention, at the point immediately prior to filtration, ammonium bicarbonate solids or other nucleating media may be added to promote crystal growth. In a still further embodiment of the invention, crystal growth is promoted by cooling the slurry. Carbon Capture Centrifuge 2030 separates the ammonium bicarbonate solids from the liquid centrate. Carbon Capture Centrifuge 2030 may utilize any number of centrifuge technologies including both horizontal solid and screen bowl type centrifuges in various embodiments of the invention. Selection of a solids separation technology is application specific. The liquid centrate is transferred to the Carbon Capture Centrate Tank 2050 via Carbon Capture Centrifuge Centrate Discharge 2034. Carbon Capture Centrate Tank 2050 also receives liquid from Bubble Cap Tower Liquid Recycle To Spray Tower 2134 and from Dewatering Primary Stripper Centrate Tank Pump Discharge Line 4262. Ammonium bicarbonate from Carbon Capture Centrifuge 2030 is transferred to the Slurry Dewatering And Drying System 4000 via Carbon Capture Centrifuge Slurry Discharge 2032. Centrate is transferred from Carbon Capture Centrate Tank 2050 to Carbon Capture Spray Tower Cooler 2070 via Carbon Capture Spray Tower Cooler Feed Pump 2060 and Carbon Capture Spray Tower Cooler Feed Pump Discharge Line 2062. Ammonia may be continuously added to Carbon Capture Spray Tower Cooler Feed Pump Discharge Line 2062 via Carbon Capture Spray Tower Ammonia Makeup Line 2064. Carbon Capture Spray Tower Cooler 2070 is cooled by Spray Tower Cooler Chill Water 2072 and discharges Spray Tower Cooler Water Return 2074. The centrate cooled by Carbon Capture Spray Tower Cooler 2070 is carried to Carbon Capture Spray Tower Nozzles 2012 via Carbon Capture Spray Tower Cooler Liquid Feed Line 2076. Optimization of both the temperature of the vessel contents in $CO_2$ Capture System 2000 and the concentration of ammonium bicarbonate contained in those vessels allows for efficient absorption of $CO_2$ and crystallization of solid ammonium bicarbonate.

Figure 2B:
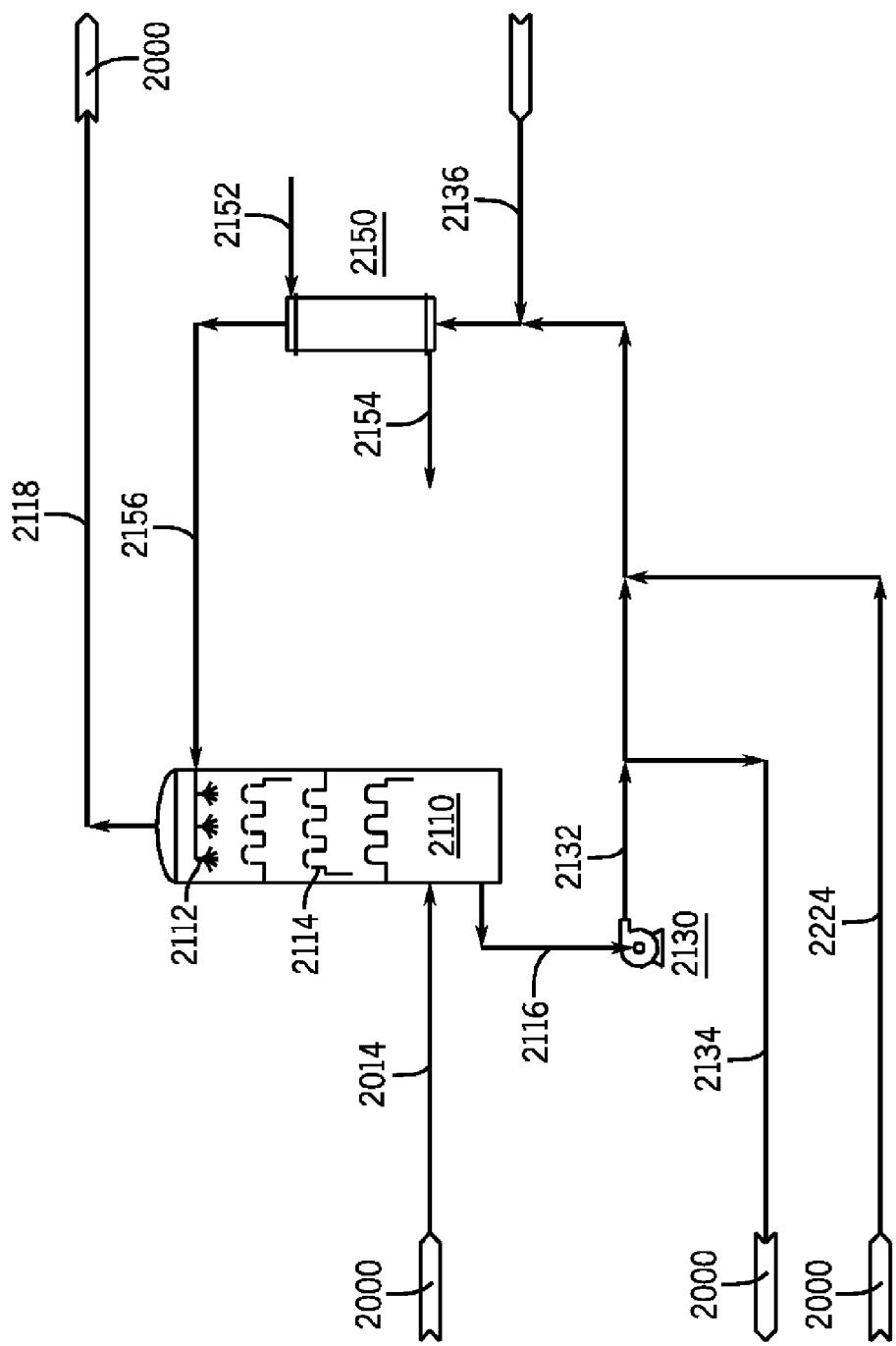
FIG. 2B shows a process flow diagram of the bubble cap absorber system.

Referring now to FIG. 2B of the drawings, Carbon Capture Spray Tower Gas Discharge 2014 is introduced to Bubble Cap Absorber 2110. Bubble Cap Absorber 2110 further reduces the carbon dioxide concentration in the source gas by allowing for the mass transfer of carbon dioxide into solution whereby ammonia reacts with carbon dioxide to form ammonium bicarbonate. The bubble cap absorber used in the second gas liquid contacting stage is somewhat tolerant to handling scrubbing solutions that may contain suspended solids. In other embodiments, additional stages of spray towers, packed beds, or bubble cap tray absorbers may be employed to optimize the carbon dioxide removal and to meet specific application requirements. Embodiments of the invention are capable of removing more than 90% of the incoming carbon dioxide from the source gas. However, alternate embodiments and modes of operation may remove significantly less carbon dioxide. For example, the process can be designed and operated to remove 10% of the incoming carbon dioxide. Selection of an appropriate embodiment will be based on a variety of factors including the removal requirements. Scrubbing is accomplished inside Bubble Cap Absorber 2110 by way of Bubble Cap Absorber Nozzles 2112 to disperse the scrubbing solution onto the Bubble Cap Trays 2114. Mass transfer occurs at the interface where the influent source gas to the bubble cap tray tower passes up through the tray and through the layer of scrubbing solution in the tray. In an embodiment of the invention, a froth is formed where enhanced mass transfer of the carbon dioxide enters the scrubbing solution. In an embodiment of the invention, the scrubbing solution flows counter-current to the up-flow gases. Treated source gas discharges from Bubble Cap Absorber 2110 via Bubble Cap Tower Gas Discharge 2118. Bubble Cap Tower Liquid Discharge 2116 is transferred to Bubble Cap Tower Cooler 2150 via Bubble Cap Tower Recycle Pump 2130 and Bubble Cap Tower Recycle Pump Discharge Line 2132. The bubble cap tower cooler is used to remove the heat of solution and heat of reaction for the carbon dioxide and ammonia reaction. A portion of the liquid effluent of Bubble Cap Absorber 2110 is recycled to Carbon Capture Centrate Tank 2050 via the Bubble Cap Tower Liquid Recycle To Spray Tower 2134. Ammonia may be added to Bubble Cap Tower Recycle Pump Discharge Line 2132 via Bubble Cap Tower Ammonia Makeup Line 2136. The effluent from Bubble Cap Absorber 2110 is supplemented by liquid from Carbon Capture Packed Tower 2210 via the Carbon Capture Packed Tower Recycle To Bubble Cap Tower 2224. Bubble Cap Tower Cooler 2150 cools the effluent from Bubble Cap Absorber 2110 and Carbon Capture Packed Tower Recycle To Bubble Cap Tower 2224. Bubble Cap Tower Cooler Chill Water Supply 2152 keeps Bubble Cap Tower Cooler 2150 cool and that cooler discharges the warmed chill water via Bubble Cap Tower Cooler Water Return 2154. The effluent from Bubble Cap Absorber 2110 that was cooled via Bubble Cap Tower Cooler 2150 is returned to the Bubble Cap Absorber Nozzles 2112 via Bubble Cap Tower Liquid Feed Line 2156.

Figure 2C:
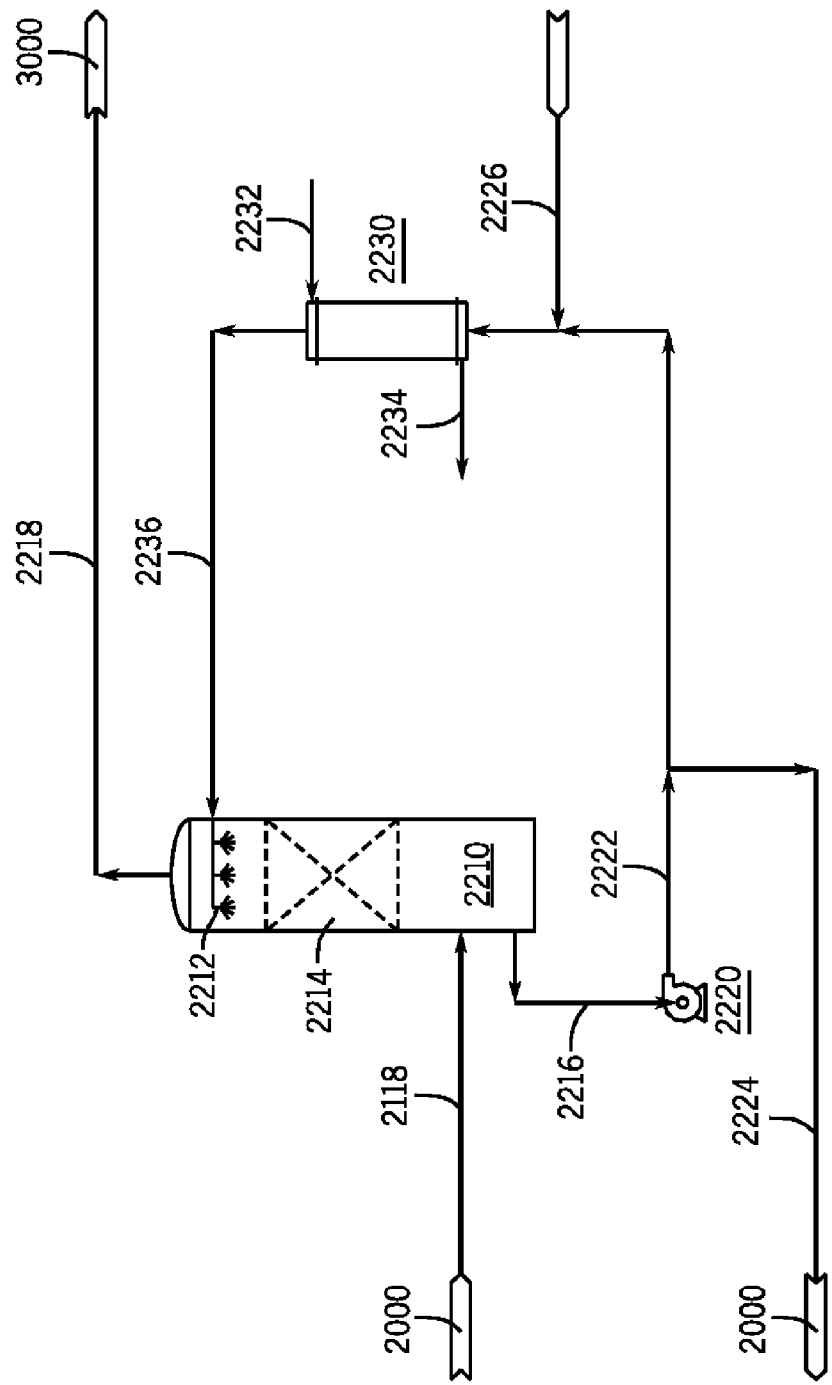
FIG. 2C shows a process flow diagram of the carbon capture packed tower system.

Referring now to FIG. 2C of the drawings, Bubble Cap Tower Gas Discharge 2118 feeds Carbon Capture Packed Tower 2210. Carbon Capture Packed Tower 2210 provides a final scrubbing of carbon dioxide from the source gas by way of direct contact of scrubbing solution with the influent source gas. Carbon Capture Packed Tower Nozzles 2212 distributes the scrubbing solution over Carbon Capture Packed Tower Fill 2214. Embodiments utilizing a packed bed absorber, such as the one shown in FIG. 3, may do so as a polishing technology to achieve high overall carbon dioxide removal efficiencies. Such embodiments will most frequently be used in applications requiring an overall carbon dioxide removal efficiency of 70% to 90%. For embodiments requiring lower removal efficiencies, the packed tower may be replaced with other mass transfer technologies or eliminated entirely from the process treatment train. Source gas exits Carbon Capture Packed Tower 2210 via Carbon Capture Packed Tower Gas Discharge 2218. Liquid effluent from Carbon Capture Packed Tower 2210 is discharged via the Carbon Capture Packed Tower Liquid Discharge 2216 to Carbon Capture Packed Tower Pump 2020. Carbon Capture Packed Tower Pump 2220 supplies the liquid effluent of Carbon Capture Packed Tower 2210 to Carbon Capture Packed Tower Cooler 2230 via Carbon Capture Packed Tower Pump Discharge 2222. A portion of that effluent is returned to the Bubble Cap Tower Recycle Pump Discharge Line 2132 via the Carbon Capture Packed Tower Recycle To Bubble Cap Tower 2224. The Carbon Capture Packed Tower Pump Discharge 2222 may be supplemented with ammonia via the Carbon Capture Packed Tower Ammonia Makeup Line 2226. The Carbon Capture Packed Tower Pump Discharge 2222 is further supplemented with ammonia from the Ammonia Recovery Absorber Pump Discharge Line 3122. Material from the Carbon Capture Packed Tower Pump Discharge 2222 is then cooled in Carbon Capture Packed Tower Cooler 2230. Chill water enters that cooler via Carbon Capture Packed Tower Cooler Chill Water Supply Line 2232 and exits by Carbon Capture Packed Tower Cooler Water Return 2234. The cooled material exiting the Carbon Capture Packed Tower Cooler 2230 is supplied to the Carbon Capture Packed Tower Nozzles 2212 via Carbon Capture Packed Tower Liquid Feed Line 2236.

Referring now collectively to FIGS. 2A, 2B, and 2C, the $CO_2$ Capture System 2000 is shown with three specific reaction devices in series for the capture of the carbon dioxide from the source gas. The number and type of reaction vessels can vary significantly in varying embodiments of the invention. Variations among embodiments of the invention may be based on factors including desired removal efficiency and selection of reaction device technology. Embodiments of the invention include the use of a variety of technologies that allow for the contact of carbon dioxide gas with the capture solution containing ammonia, ammonium bicarbonate, and ammonium carbonate to accomplish the mass transfer from the source gas to the scrubbing solution. Selection of the technology to accomplish the mass transfer and reaction to ammonium bicarbonate is application specific. Certain embodiments of the invention include the use of mass transfer devices such as bubble cap towers, spray towers, sieve tray towers, and packed bed towers. Mass transfer devices are operated at or near atmospheric pressure in most embodiments of the invention. Certain embodiments of the invention include a wide range of source gas pressures having acceptable yields.

Figure 3:
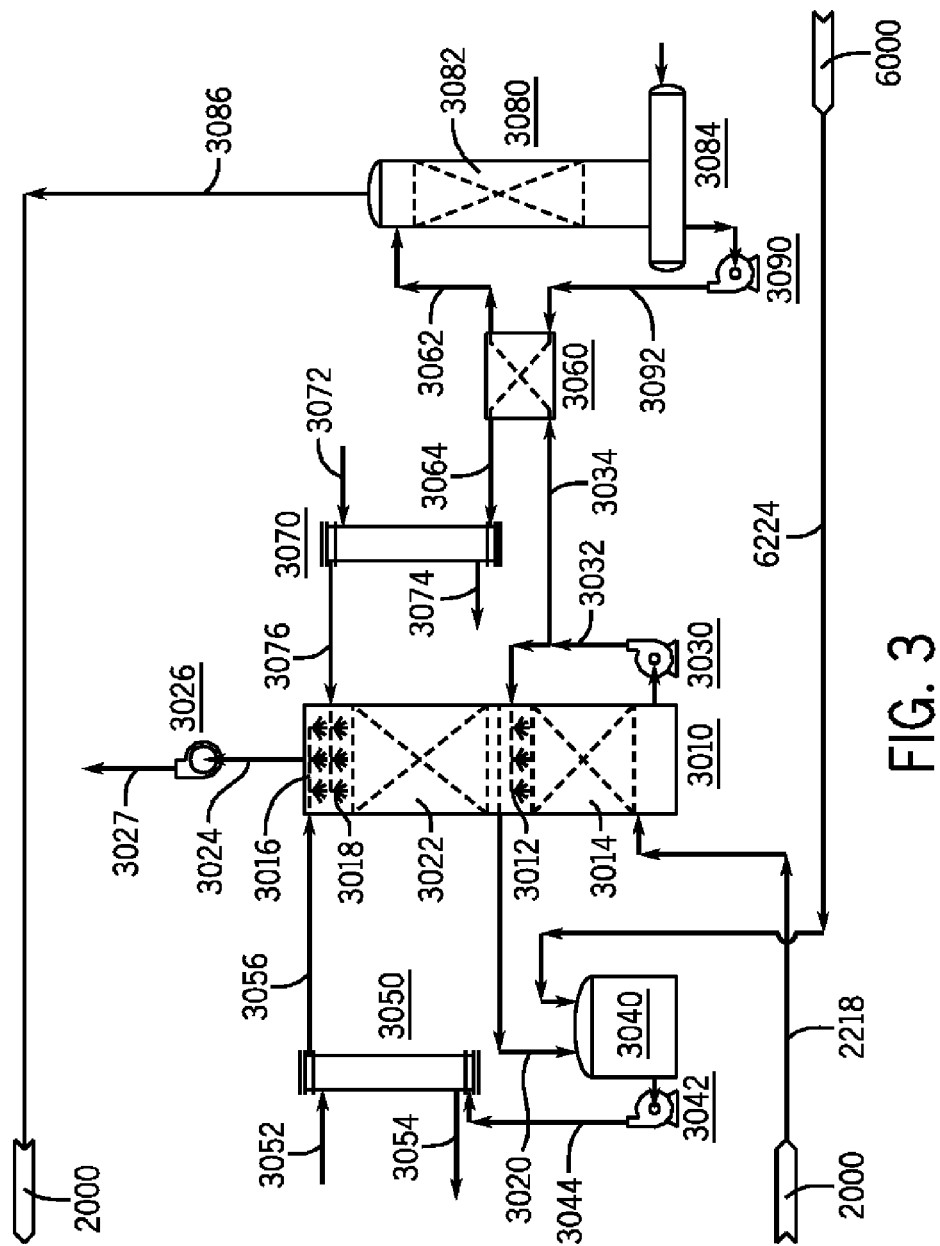
FIG. 3 shows a process flow diagram of the ammonia recovery system.

Referring now to FIG. 3 of the drawings, treated source gas of reduced carbon dioxide content enters the Ammonia Recovery System 3000 from the $CO_2$ Capture System 2000 via Carbon Capture Packed Tower Gas Discharge 2218. The treated source gas in Carbon Capture Packed Tower Gas Discharge 2218 will contain a certain amount of unreacted ammonia gas. The ammonia gas will for most applications require removal before the carbon dioxide depleted source gas is discharged to the atmosphere. The ammonia is scrubbed from the source gas in this embodiment using water. The Carbon Capture Packed Tower Gas Discharge 2218 is introduced to the bottom of Wash Water Ammonia Absorber 3010. Wash Water Ammonia Absorber 3010 contains Wash Water Ammonia Absorber Nozzles From Wash Water Tank 3016; Wash Water Ammonia Absorber Nozzles Supplied From The Stripper 3018; Wash Water Ammonia Absorber Top Fill 3022; Wash Water Ammonia Absorber Intermediate Drain Line 3020; Wash Water Ammonia Absorber Bottom Nozzles 3012; and Wash Water Ammonia Absorber Bottom Fill 3014 and is a direct contact countercurrent packed bed scrubber. The scrubber solution collects in the bottom of the sump from Wash Water Ammonia Absorber 3010 and is recycled to Wash Water Ammonia Absorber Bottom Nozzles 3012 via Wash Water Ammonia Absorber Recycle Pump 3030 and Wash Water Ammonia Absorber Recycle Pump Discharge Line 3032. Wash Water Ammonia Absorber Bottom Nozzles 3012 spray over the Wash Water Ammonia Absorber Bottom Fill 3014. A portion of the material from the Wash Water Ammonia Absorber Recycle Pump Discharge Line 3032 is pumped to Stripper 3080 through Stripper Heat Exchanger 3060 via Wash Water Discharge To Stripper 3034 and Stripper Wash Water Feed Line 3062. Stripper 3080 removes ammonia contained in the wash water supplied from Stripper Wash Water Feed Line 3062. The surface area for the liquid-to-gas transfer of ammonia is enhanced by Stripper Fill 3082. Heat is provided to the sump of Stripper 3080 by steam heating Stripper Reboiler 3084. In alternate embodiments, the reboiler could include the use of various other heat sources including electricity, hot water, fired heater, or steam. Selection of these sources should be based on site specific conditions. Ammonia lean wash water from the sump of Stripper 3080 is transferred via Stripper Pump 3090 and Stripper Pump Discharge Line 3092 through Stripper Heat Exchanger 3060 and through Ammonia Lean Stripper Heat Exchanger Discharge Line 3064 to Stripper Effluent Cooler 3070. Stripper Effluent Cooler 3070 is cooled by Stripper Effluent Cooler Chill Water 3072 which is discharged via Stripper Effluent Cooler Water Return Line 3074. Cooled Stripper Effluent Return Line 3076 carries the ammonia lean scrubbed wash water back to Wash Water Ammonia Absorber Nozzles Supplied From The Stripper 3018 inside Wash Water Ammonia Absorber 3010. Wash Water Ammonia Absorber Nozzles From Wash Water Tank 3016 and Wash Water Ammonia Absorber Nozzles Supplied From The Stripper 3018 both spray over wash water ammonia absorber top fill. Source gas travels through Wash Water Ammonia Absorber 3010 passing Wash Water Ammonia Absorber Bottom Fill 3014, Wash Water Ammonia Absorber Bottom Nozzles 3012, Wash Water Ammonia Absorber Intermediate Drain Line 3020, Wash Water Ammonia Absorber Top Fill 3022, Wash Water Ammonia Absorber Nozzles Supplied From The Stripper 3018, and Wash Water Ammonia Absorber Nozzles From Wash Water Tank 3016, in that order, prior to exiting Wash Water Ammonia Absorber 3010 via Wash Water Ammonia Absorber Exhaust Line 3024. Wash Water Ammonia Absorber Exhaust Fan 3026 creates a partial vacuum in Wash Water Ammonia Absorber 3010 to assist the movement of source gas throughout the system. Wash Water Ammonia Absorber Intermediate Drain Line 3020 takes wash water from a portion of Wash Water Ammonia Absorber 3010 which is intermediate Wash Water Ammonia Absorber Top Fill 3022 and Wash Water Ammonia Absorber Bottom Fill 3014 and delivers that wash water to Water Wash Tank 3040. Water Wash Tank 3040 holds wash water for delivery to Wash Water Cooler 3050 by Water Wash Tank Pump 3042 and Water Wash Tank Pump Discharge Line 3044. Wash Water Cooler 3050 cools wash water with chill water from Wash Water Cooler Chill Water Supply Line 3052 discharging the heated chill water via the Wash Water Cooler Water Return 3054. Wash Water Cooler Wash Water Return Line 3056 returns the cooled wash water to the Wash Water Ammonia Absorber 3010 and the Wash Water Ammonia Absorber Nozzles From Wash Water Tank 3016.

From the top of Stripper 3080 an ammonia containing gaseous stream is carried by the Stripper Gas Effluent Line 3086 to the Feed Line To $CO_2$ Capture System 1050 and ultimately to Carbon Capture Spray Tower 2010. This recycled ammonia reacts in the spray tower with the carbon dioxide to make product, thereby reducing the required ammonia makeup to the system.

In an embodiment of the invention, the source gas that exits the $CO_2$ Capture System 2000 will contain approximately 500 to 10,000 ppm of ammonia. In that embodiment, the concentration of ammonia in the treated source gas that is exhausted from Ammonia Recovery System 3000 to an exhaust stack may be controlled to less than 5 ppm.

Figure 4:
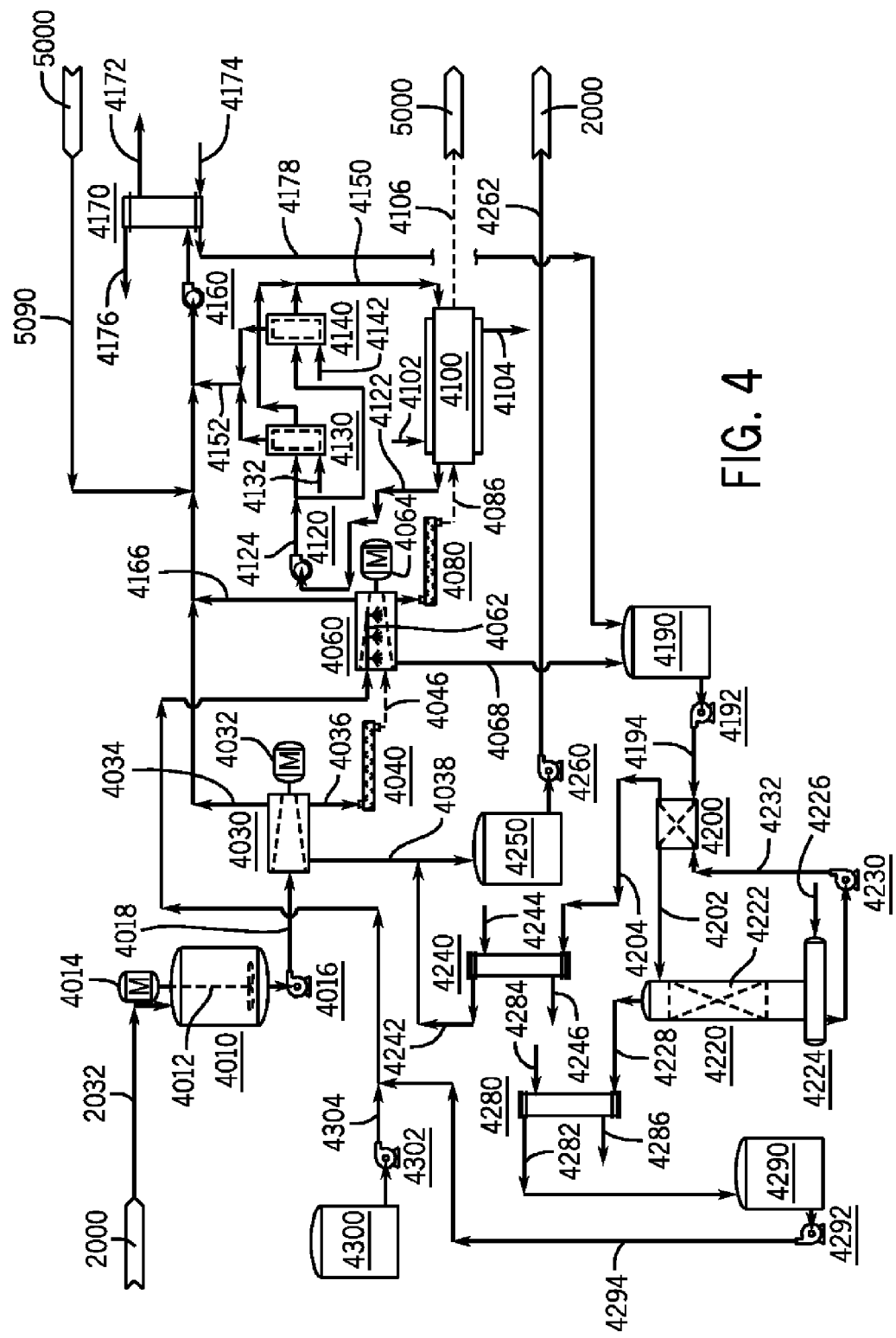
FIG. 4 shows a process flow diagram of the dewatering and drying system.

Now referring to FIG. 4 of the drawings, material from Carbon Capture Centrifuge 2030 flows to Dewatering Centrifuge Feed Tank 4010 by way of Carbon Capture Centrifuge Slurry Discharge 2032. In an embodiment of the invention not shown in the figure, prior to dewatering, gravity settlers or other solids concentrating devices may be employed, depending on the specific application, to provide crystal growth needed to facilitate efficient dewatering and particle growth. This tank may be cooled and nucleating agents added to promote crystallization. Dewatering Centrifuge Feed Tank 4010 has an impeller, Dewatering Centrifuge Feed Tank Impeller 4012, that is driven by Dewatering Centrifuge Feed Tank Impeller Motor 4014. Material passes from Dewatering Centrifuge Feed Tank 4010 to Dewatering Primary Centrifuge 4030 via Dewatering Centrifuge Feed Tank Pump 4016 and Dewatering Primary Centrifuge Feed Line 4018. Dewatering Primary Centrifuge 4030 further dewaters the ammonium bicarbonate and is driven by Dewatering Primary Centrifuge Motor 4032. Centrate from Dewatering Primary Centrifuge 4030 is passed to Dewatering Primary Stripper Centrate Tank 4250 via Dewatering Primary Centrifuge Centrate Discharge Line 4038. Dewatering Primary Stripper Centrate Tank Pump 4260 pumps centrate from Dewatering Primary Stripper Centrate Tank 4250 to Carbon Capture Centrate Tank 2050 via Dewatering Primary Stripper Centrate Tank Pump Discharge 4262. Air is drawn from Dewatering Primary Centrifuge 4030 via Dryer Vent Fan 4160 through Dewatering Primary Centrifuge Air Purge Line 4034. Solids consisting primarily of ammonium bicarbonate are discharged from the Dewatering Primary Centrifuge 4030 to the Dewatering Primary Centrifuge Solids Discharge Screw Conveyor 4040 via Dewatering Primary Centrifuge Solids Discharge Line 4036. The embodiment shown in the figures utilizes a screw type conveyor for solids/sludge transfer. Alternate embodiments of the invention may include any suitable solids or sludge type conveyor. Example solids conveying equipment that may be used in alternate embodiments of the invention include slurry pumps, belt conveyors, drag flight conveyors, bucket conveyors, pan conveyors, and apron conveyors. Dewatering Primary Centrifuge Solids Discharge Screw Conveyor 4040 carries the ammonium bicarbonate sludge to the Dewatering Secondary Centrifuge Feed Line 4046 which feeds the Dewatering Secondary Centrifuge 4060. Dewatering Secondary Centrifuge 4060 contains Dewatering Secondary Centrifuge Alcohol Injection Nozzles 4062 which spray alcohol over the ammonium bicarbonate solids in Dewatering Secondary Centrifuge 4060. The alcohol spray washes and rinses the ammonium bicarbonate solids in Dewatering Secondary Centrifuge 4060, thereby decreasing the moisture content of the solids. Embodiments of the invention include the use of drying alcohols that may be employed, depending on the specific application and availability and cost of the alcohol. Various embodiments of the invention utilize drying alcohols, including ethyl alcohol and isopropyl alcohol. The ammonium bicarbonate is not soluble in such alcohols, the alcohols have a high affinity for water, and the alcohols are effectively evaporated with low heat requirements. The selection of the type of alcohol used in this process will depend on the integration of the alcohol recovery process with existing plant processes. In an embodiment of the invention, a fermentation process may contain alcohol waste recovery processes whereby the alcohol water stream recovered from this technology could be reused and recovered in the fermentation process. The use of alcohol to assist in reducing the moisture content of the ammonium bicarbonate solids will result in a more energy-efficient process by reducing the energy required to remove the moisture in the subsequent drying process. Dewatering Secondary Centrifuge 4060 is driven by Dewatering Secondary Centrifuge Motor 4064. Dewatering Secondary Centrifuge 4060 discharges to Dewatering Secondary Centrifuge Solids Discharge Screw Conveyor 4080 which carries the ammonium bicarbonate to Dryer Feed Line 4086 which in turn feeds Dryer 4100. Dryer 4100 shown in FIG. 4 is a low temperature rotary vacuum dryer system that functions to evaporate residual alcohol and moisture from the ammonium bicarbonate solids. In alternate embodiments of this invention, other dryer technologies could be employed for this application. In an embodiment of the invention, dryer temperature is managed at a temperature that optimizes process economics considering that above approximately 135° F. ammonium bicarbonate decomposes. Dryer 4100 shown in FIG. 4 is heated by Dryer Steam Feed Line 4102 and condensate is removed via Dryer Steam Condensate Return 4104. Any economical source of heat that is available to the process could be used to operate the dryer. Heat sources include solar energy, wind energy, electricity, hot water, and fired heaters. Dryer Discharge Line 4106 carries the dried ammonium bicarbonate to the Product Coating And Packaging System Feed Conveyor 5010 within the Product Coating And Packaging System 5000. Air containing alcohol and water vapors is removed from Drier 4100 via Dryer Moist Air Discharge 4122 with the aid of Dryer Blower 4120 which connects Dryer Moist Air Discharge 4122 and the Dryer Blower Discharge 4124. Primary Desiccant Drier 4130 removes moisture from the air fed to it via Dryer Blower Discharge 4124. Secondary Desiccant Drier 4140 similarly removes moisture from the Dryer Blower Discharge 4124. Both the Primary Desiccant Drier 4130 and the Secondary Desiccant Drier 4140 discharge to the Dryer Dry Air Inlet 4150 which returns dry air to Dryer 4100. Primary Desiccant Drier 4130 and Secondary Desiccant Drier 4140 have inlets, Primary Desiccant Drier Hot Dry Air Inlet 4132 and Secondary Desiccant Drier Hot Dry Air Inlet 4142 respectively. Desiccants are regenerated by a combination of reduced pressure and heat addition to liberate the alcohol and water to the Desiccant Dryer Regeneration Discharge Line 4152. Desiccant Dryer Regeneration Discharge Line 4152 carries air from Primary Desiccant Drier 4130 and Secondary Desiccant Drier 4142 to Dewatering Primary Centrifuge Air Purge Line 4034. Primary Desiccant Drier 4130 and Secondary Desiccant Drier 4140 are arranged such that one can be in drying service while the other is being regenerated. Air and other gases that have joined Dewatering Primary Centrifuge Air Purge Line 4034 are moved by Dryer Vent Fan 4160 to Dryer Vent Condenser 4170 where a portion of the gases are condensed and sent to Dewatering Secondary Centrifuge Centrate Tank 4190 by Dryer Vent Condenser Condensate Line 4178. The remaining gases are discharged in the atmosphere via Dryer Vent Condenser Vent To Atmosphere 4172. Dryer Vent Condenser 4170 is cooled by Dryer Vent Condenser Chill Water Supply 4174 and the heated chill water is returned by Dryer Vent Condenser Chill Water Return 4176. Dewatering Secondary Centrifuge Centrate Tank 4190 delivers centrate to the top of Dewatering Stripper 4220 by way of Dewatering Secondary Centrifuge Centrate Tank Pump 4192, Dewatering Secondary Centrifuge Centrate Tank Pump Discharge Line 4194, Dewatering Stripper Heat Exchanger 4200, and Dewatering Stripper Feed 4202. The centrate from Dewatering Secondary Centrifuge Centrate Tank 4190 is heated in the Dewatering Stripper Heat Exchanger 4200. Dewatering Stripper 4220 contains Dewatering Stripper fill 4222 and the Dewatering Stripper Reboiler 4224. Dewatering Stripper 4220 is a distillation column for the separation of alcohol from the centrate delivered from Dewatering Secondary Centrifuge Centrate Tank 4190. Dewatering Stripper Reboiler 4224 is heated by Dewatering Stripper Reboiler Steam Supply Line 4226. Liquid from the bottom of Dewatering Stripper 4220 is pumped via Dewatering Stripper Pump 4230 through Dewatering Stripper Pump Effluent Line 4232 to Dewatering Stripper Heat Exchanger 4200 where it is cooled before being sent to the Cooler For Alcohol Stripped Centrate 4240 by the Cooled Dewatering Stripper Liquid Effluent Line 4204. Cooler For Alcohol Stripped Centrate 4240 is cooled by water from the Chill Water Supply Line For Cooler For Alcohol Stripped Centrate 4244 and the chill water is returned by Chill Water Return Line For Cooler For Alcohol Stripped Centrate 4246. Cooled centrate is then carried from the Cooler For Alcohol Stripped Centrate 4240 to the Dewatering Primary Centrifuge Centrate Discharge Line 4038 by way of the Cooled Stripped Centrate Line 4242 and then ultimately to the Dewatering Primary Stripper Centrate Tank 4250. Alcohol evolved from Dewatering Stripper 4220 is carried to the Dewatering Alcohol Condenser Cooler 4280 by the Dewatering Stripper Gas Effluent Line 4228. The Dewatering Alcohol Condenser Cooler 4280 is cooled by water from Dewatering Alcohol Condenser Cooler Chill Water Supply Line 4284 and that water is discharged by Dewatering Alcohol Condenser Cooler Chill Water Return Line 4286. Liquid alcohol is discharged from Dewatering Alcohol Condenser Cooler 4280 and carried to Alcohol Collection Tank 4290 via Dewatering Alcohol Condenser Cooler Effluent Line 4282. Alcohol is provided to Dewatering Secondary Centrifuge 4060 from Alcohol Storage Tank 4300 through Alcohol Storage Tank Pump 4302 and Alcohol Storage Tank Pump Discharge Line 4304. The alcohol supplied to the Dewatering Secondary Centrifuge 4060 from Alcohol Storage Tank 4300 is mixed with alcohol from Alcohol Collection Tank 4290 via Alcohol Collection Tank Pump 4292 and Alcohol Collection Tank Pump Discharge Line 4294 which joins Alcohol Storage Tank Pump Discharge Line 4304.

Now referring to FIG. 5 of the drawings, Dryer Discharge Line 4106 feeds into Product Coating And Packaging System Feed Conveyor 5010 which in turn supplies ammonium bicarbonate to ABC Pneumatic Conveyor Feed Hopper 5020. The Product Coating And Packaging System Feed Conveyor 5010 is driven by Product Coating And Packaging System Feed Conveyor Motor 5012. ABC Pneumatic Conveyor Feed Hopper 5020 feeds ammonium bicarbonate to ABC Pneumatic Conveyor Beginning 5040 through ABC Pneumatic Conveyor Rotary Feed Valve 5022. ABC Pneumatic Conveyor Blower 5030 blows air past ABC Pneumatic Conveyor Beginning 5040 through ABC Pneumatic Conveyor Line 5042 and into Packaging ABC Solids Separator 5048. Packaging ABC Solids Separator 5048 separates the majority (by weight) of solids into ABC Silo 5050. The majority of airflow containing some particulate matter passes to ABC Fabric Filter 5080 by way of Packaging ABC Fines Line To Fabric Filter 5052. ABC Silo 5050 is made up of an ABC Silo Tapered Region 5054 and an ABC Silo Vibrator 5055 having an ABC Silo Vibrator Motor 5056. ABC Silo Discharge Rotary Feeder 5058 is located at the bottom of ABC Silo 5050 and is driven by ABC Silo Discharge Rotary Feeder Motor 5060. ABC Silo Discharge Rotary Feeder 5058 feeds ammonium bicarbonate to Pug Mill Mixer 5140 via Pug Mill Mixer ABC Feed Line 5070. Pug Mill Mixer 5140 coats the ammonium bicarbonate crystals with urea that acts as a stabilizing additive to minimize decomposition of the ammonium bicarbonate solids Ammonium bicarbonate that is not directed to ABC Silo 5050 at Packaging ABC Solids Separator 5048 is captured on ABC Fabric Filter 5080 and travels to ABC Fabric Filter Screw Conveyor 5084 via ABC Fabric Filter Tapered Discharge 5082. ABC Fabric Filter Screw Conveyor Motor 5086 drives ABC Fabric Filter Screw Conveyor 5084. Ammonium bicarbonate material is returned to ABC Pneumatic Conveyor Feed Hopper 5020 from the discharge of ABC Fabric Filter Screw Conveyor 5084 via ABC Fabric Filter Screw Conveyor Discharge Line To Pneumatic Conveyor Feed Hopper 5088. Urea is provided from urea unloading station (not shown) and travels to Urea Tank 5100 via Urea Supply Line 5101. Urea Tank 5100 contains Urea Tank Impeller 5102 which is driven by Urea Tank Impeller Motor 5104 to mix the solid urea with alcohol. The urea dissolves in the alcohol. The urea solution is then pumped to Pug Mill Mixer 5140 via Urea Feed Line For Pug Mill Mixer 5124. The urea is applied to the outside surface of the ammonium bicarbonate as a thin film. This coating acts to stabilize the ammonium bicarbonate, extending the shelf life by reducing the liberation of ammonia that results from the slow decomposition of ammonium bicarbonate over time. Pug Mill Mixer 5140 mixes the urea and ammonium bicarbonate and discharges the mixture to Pug Mill Mixer Discharge Line 5142. Product Pneumatic Conveyance Line Blower 5150 moves air through Product Pneumatic Conveyance Line 5152 picking up product from the Pug Mill Mixer Discharge Line 5142 and carrying that product to Product Silo 5160. Product Silo 5160 contains a Tapered Portion Of Product Silo 5162 and a Product Silo Vibrator 5163 that is driven by Product Silo Vibrator Motor 5164. Product Silo Rotary Feeder 5166 is driven by Product Silo Rotary Feeder Motor 5168 and delivers product to Packaging Station 5170. Delivery System 5180 carries packaged product to a product destination. In an embodiment of the invention, Packaging Station 5170 fills super-sacks with product for off-site use as a commercial fertilizer. In another embodiment, other packaging methods such as pelletizing or packaging in smaller containers, bulk rail cars or tank trucks may be employed depending on demand.

Emissions from Product Coating And Packaging System 5000 are collected and treated in an air pollution control system (not shown) that includes a dust collecting bag house and a packed bed scrubber for alcohol removal and a packed bed scrubber for ammonia removal. The alcohol scrubber blow-down is recycled to the urea feed tank and the ammonia scrubber blow-down is recycled to the Ammonia Recovery System 3000 for recovery of the ammonia from that blow-down. Bag house solids are recycled to a production line component of the Product Coating And Packaging System 5000.

In other embodiments of the invention, urea may be replaced by other stabilizing additives, or eliminated entirely. The primary effect of the urea coating is to seal the surface of the crystals and minimize product decomposition.

Now referring to FIG. 6 of the drawings, Source Gas Cooling Tower Blow-Down Line 1080 delivers blow-down from Source Gas Cooler 1020 to Wastewater Storage Tank 6010 in Wastewater Treatment System 6000. The requirement for waste water treatment is site and application specific. Some sites will have existing wastewater treatment systems that can accept the wastewaters from embodiments of the invention, in which case no waste water treatment equipment will be required. The design and operation of the waste water treatment system will also be site specific as the water treatment criteria are usually dictated by not only federal regulations but in most instances local regulatory agencies and municipalities. The wastewater treatment system process depicted on FIG. 6 is what could typically be expected to meet basic water cleanup requirements. Wastewater Storage Tank Pump 6012 transfers material from Wastewater Storage Tank 6010 to Air Bubbler Oxidizer 6020 via Wastewater Storage Tank Pump Discharge Line 6014. Air Bubbler Oxidizer 6020 has an Air Bubbler Oxidizer Blower 6022 which blows air through Air Bubbler Oxidizer Nozzles 6024. Air from Air Bubbler Oxidizer Nozzles 6024 passes through Air Bubbler Oxidizer 6020 and is exhausted through Air Bubbler Oxidizer Exhaust Line 6026. Material overflows by gravity to Wastewater Treatment First Mixing Vessel 6040 from Air Bubbler Oxidizer 6020 via Air Bubbler Oxidizer Liquid Discharge Line 6028. Wastewater Treatment First Mixing Vessel 6040 is stirred continuously by Wastewater Treatment First Mixing Vessel Impeller 6042. Wastewater Treatment First Mixing Vessel 6040 overflows into Wastewater Treatment Second Mixing Vessel 6050 which is mixed via Wastewater Treatment Second Mixing Vessel Impeller 6052. Wastewater Treatment Second Mixing Vessel 6050 overflows into Wastewater Treatment Third Mixing Vessel 6060 which is mixed via Wastewater Treatment Third Mixing Vessel Impeller 6062. Wastewater Treatment Third Mixing Vessel 6060 is gravity drained to Wastewater Treatment Inclined Plane Clarifier 6080 via Wastewater Treatment Third Mixing Vessel Discharge Line 6070. The Wastewater Treatment First Mixing Vessel 6040 is treated with ferric chloride from Ferric Chloride Storage Tank 6230 which is metered by Ferric Chloride Metering Pump 6240 and delivered by Ferric Chloride Metering Pump Discharge Line 6242. A solution of ferric chloride is maintained in Ferric Chloride Storage Tank 6230 through the addition of water through Ferric Chloride Storage Tank Process Water Line 6232, the addition of ferric chloride through Ferric Chloride Supply Line 6234, and mixing it is accomplished by Ferric Chloride Storage Tank Impeller 6236 which is driven by the Ferric Chloride Storage Tank Impeller Motor 6238. Wastewater Treatment Second Mixing Vessel 6050 is treated with a lime solution from Lime Slurry Tank 6260. A solution of lime water is maintained in Lime Slurry Tank 6260 through the addition of process water via Lime Slurry Tank Water Supply Line 6262, lime supplied through Lime Supply Line 6264, and mixing provided by Lime Slurry Tank Impeller 6268 which is driven by Lime Slurry Tank Impeller Motor 6269. The lime solution in Lime Slurry Tank 6260 is delivered to Wastewater Treatment Second Mixing Vessel 6050 in a controlled manner by Lime Slurry Metering Pump 6270. Wastewater Treatment Third Mixing Vessel 6060 is treated with a polymer solution that is delivered via Polymer Metering Pump 6298. Polymer Metering Pump 6298 is supplied with polymer from Polymer Drum 6290 via Polymer Drum Discharge 6292. Polymer Dilution Water Line 6294 delivers water to Polymer Drum Discharge 6292 for mixing of the polymer water solution at Polymer Solution In-Line Mixer 6296. The polymer solution from Polymer Solution In-Line Mixer 6296 is fed to Polymer Metering Pump 6298. Wastewater treatment inclined plane clarifier overflows into the Wastewater Treatment Clarifier Overflow Tank 6180 via Wastewater Treatment Inclined Plane Clarifier Discharge 6082. Wastewater Treatment Inclined Plane Clarifier 6080 discharges the bottoms of the clarifier to Wastewater Treatment Filter Feed Tank 6100 via Wastewater Treatment Inclined Plane Clarifier Pump 6090 and Wastewater Treatment Inclined Plane Clarifier Pump Discharge Line 6092. The sludge is stored in the Wastewater Treatment Filter Feed Tank 6100 before it is pumped to the wastewater treatment system filter press. The discharge from Wastewater Treatment Filter Feed Tank 6100 is pumped to Wastewater Treatment Plate And Frame Filter Press 6140 via Wastewater Treatment Progressive Cavity Filter Feed Pump 6120 driven by Wastewater Treatment Progressive Cavity Filter Feed Pump Motor 6122 and Wastewater Treatment Progressive Cavity Filter Feed Pump Discharge Line 6130. Wastewater Treatment Plate And Frame Filter Press 6140 separates solids into a filter cake that is then collected in Filter Cake Portable Bin 6160 which is then transported offsite for disposal utilizing Filter Cake Portable Bin Disposal Travel Path 6162. Filtrate from Wastewater Treatment Plate And Frame Filter Press 6140 is delivered to Wastewater Treatment Plate And Frame Filter Press Filtrate Tank 6170 Via Wastewater Treatment Plate And Frame Filter Press Filtrate Discharge Line 6142. Filtrate from Wastewater Treatment Plate And Frame Filter Press Filtrate Tank 6170 is transferred to Wastewater Treatment Clarifier Overflow Tank 6180 via Wastewater Treatment Plate And Frame Filter Press Filtrate Pump 6172 and Wastewater Treatment Plate And Frame Filter Press Filtrate Pump Discharge Line 6174. The contents of Wastewater Treatment Clarifier Overflow Tank 6180 are passed to Wastewater Treatment Ion Exchange Resin Bed 6200 via Wastewater Treatment Clarifier Overflow Tank Pump 6182, Wastewater Treatment Clarifier Overflow Tank Pump Discharge Line 6184, Wastewater Treatment Clarifier Overflow Tank First Bag Filter 6186, and Wastewater Treatment Clarifier Overflow Tank Second Bag Filter 6188, respectively. Wastewater Treatment Ion Exchange Resin Bed 6200 discharges to Wastewater Treatment Treated Effluent Storage Tank 6210 via Wastewater Treatment Ion Exchange Resin Bed Discharge 6202. Wastewater from Wastewater Treatment Treated Effluent Storage Tank 6210 is pumped via Wastewater Treatment Treated Effluent Storage Tank Transfer Pump 6220 to an outfall via Wastewater Treatment Treated Effluent Storage Tank Transfer Pump Line To Outfall 6222 and to Ammonia Recovery Absorber Chiller Tank 3140 via Wastewater Treatment Treated Effluent Storage Tank Transfer Pump Line To Absorber System 6224. Any treated wastewaters that are not required for recycle and reuse within the carbon capture plant can be pumped to the plant wastewater treatment system associated with the process that generated the combustion gas so that the combined wastewaters can be discharged from a single permitted outfall. In alternative embodiments, the wastewater could be discharged to a permitted outfall or even pumped to a local publicly owned treatment works (POTW). The determination of the wastewater disposition is site and application specific.

In an embodiment of the invention, Wastewater Treatment System 6000 treats blow-down water from Source Gas Cooler 1020 and other miscellaneous internal processes. The flow rates of other miscellaneous waste streams entering Wastewater Treatment System 6000 may be relatively small in comparison to the blow-down water from Source Gas Cooler 1020. The flow rate of wastewater requiring treatment is dependent on the application and specifically dependent on the flow rate and characteristics of the influent source gas.

The embodiment of the invention shown in the figures, particularly FIGS. 2A and 4, shows thickening of the slurry which is accomplished using a centrifuge. Alternate embodiments of the invention may employ a variety of thickening/dewatering equipment and combinations thereof, including equipment such as gravity thickeners, belt filter presses, plate and frame filter presses, vacuum filters, evaporators and hydroclones.

In an embodiment of the invention, the carbon capture plant could be designed to process any flow rate of source gas at any removal efficiency of the $CO_2$ from the incoming source gas to over 90% removal. That embodiment would generate approximately 1 pound of product fertilizer for every cubic foot of influent source gas at a carbon dioxide removal efficiency of 90%.

Fermentation Gas Treatment

The treatment of fermentation gas to remove carbon dioxide and make fertilizer is similar to the treatment of combustion flue gas. The following description primarily portrays the areas where the treatment of fermentation gas varies significantly with treatment of combustion flue gas. Reference to the description of flue gas treatment coupled with the description of appropriate modifications for the treatment of fermentation gas should enable the treatment of fermentation gas for those having ordinary skill in the art.

Figure 8:
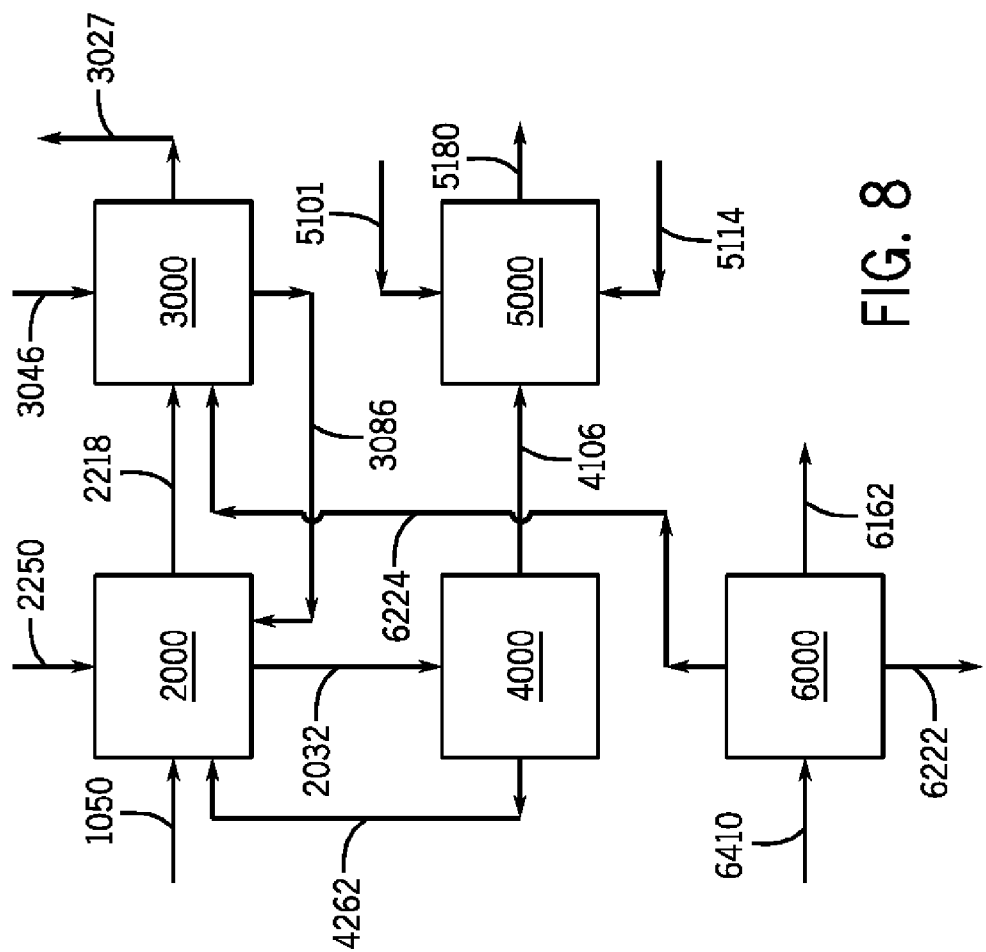
FIG. 8 shows an overview of the carbon capture process in block flow diagram format as used in the capture of carbon dioxide from an ethanol fermentation production process.

Referring now to FIG. 8 of the drawings, fermentation gas is delivered directly from a fermentation process to $CO_2$ Capture System 2000 via Feed Line To $CO_2$ Capture System 1050 without any treatment by equipment associated with Source Gas Cooler System 1000. Embodiments of the invention may require the source gas cooler process step for a fermentation gas if the gas is above about 100° F. and/or is not saturated with water vapor. Bubble Cap Tower Ammonia Makeup Line 2136 supplies anhydrous ammonia to $CO_2$ Capture System 2000. Carbon Capture Centrifuge Slurry Discharge 2032 carries a slurry of predominantly ammonium bicarbonate from the $CO_2$ Capture System to the Slurry Dewatering And Drying System 4000. Centrate is recycled from the Slurry Dewatering And Drying System 4000 to the $CO_2$ Capture System 2000 by Dewatering Primary Stripper Centrate Tank Pump Discharge Line 4262. Carbon Capture Packed Tower Gas Discharge 2218 carries $CO_2$ lean fermentation gas to Ammonia Recovery System 3000. Fermentation gas leaves the Ammonia Recovery System 3000 via Line To Source Gas Exhaust Stack 3027. Ammonia rich blow-down is recycled from Ammonia Recovery System 3000 to $CO_2$ Capture System 2000 via Ammonia Recovery Absorber Pump Discharge Line 3122. Water Wash Tank Water Supply Line 3046 supplies make-up water to the Ammonia Recovery System 3000. Slurry Dewatering And Drying System 4000 dries the ammonium bicarbonate for transfer to Product Coating and Packaging System 5000 via Dryer Discharge Line 4106. Product Coating And Packaging System 5000 enriches the ammonium bicarbonate with urea from Urea Supply Line 5101 for packaging and delivery by Delivery System 5180. It is likely that a fermentation process will already have a wastewater treatment system capable of handling the miscellaneous small wastewater streams from the invention. However, if not, the Wastewater Treatment System 6000 would treat wastewater from various sources within the process that are delivered by Miscellaneous Process Waste Line 6410. Miscellaneous Process Waste Line 6410 feeds Wastewater Treatment System 6000 in the same way that Source Gas Cooling Tower Blow-Down Line 1080 does in the flue gas treatment configuration. However, the flow through Miscellaneous Process Waste Line 6410 is greatly diminished because cooling tower blow-down water is not being treated and there will not be any condensed water from the source gas cooler system. Liquid waste is discharged from Wastewater Treatment System 6000 via Wastewater Treatment Treated Effluent Storage Tank Transfer Pump Line To Outfall 6222 and solid waste is discharged via Filter Cake Portable Bin Disposal Travel Path 6162. In another embodiment of the invention, the wastewater from this carbon capture plant could be treated sufficiently and then combined with other wastewaters from the fermentation process so that there is a single discharge stream to an existing permitted outfall. By combining these treated wastewater streams, only one outfall permit would be required. In another embodiment, the wastewater could be discharged to a permitted outfall or even pumped to a local publicly owned treatment works (POTW). The determination of the wastewater disposition is site and application specific. A portion of the liquid effluent from Wastewater Treatment System 6000 is returned to Ammonia Recovery System 3000 via Wastewater Treatment Treated Effluent Storage Tank Transfer Pump Line To Absorber System 6224.

In an embodiment of the invention, the process equipment depicted in FIG. 1 of the drawings is not required because a low temperature water saturated fermentation gas is used as the source gas. For this reason, the fermentation gas is fed directly from the fermentation process to Carbon Capture Spray Tower 2010 via Feed Line To $CO_2$ Capture System 1050. Because there is no Source Gas Cooler 1020, there is no blow-down from this type of process equipment to be treated in Wastewater Treatment System 6000.

The fermentation gas embodiment would have a Water Wash Tank Water Supply Line 3046 that supplies make-up water to the Water Wash Tank 3040 that is not shown in FIG. 3 of the drawings. The fermentation gas embodiment could receive alcohol from the fermentation process rather than from Alcohol Storage Tank 4300 and Alcohol Storage Tank Pump 4302. This variation is not reflected in FIG. 4 of the drawings.

In an embodiment of the invention, the carbon capture plant would be designed to process any flow rate of fermentation gas at $CO_2$ removal efficiencies of 10% to over 90% from the incoming fermentation gas. In that embodiment, fermentation gas compositions would vary but would typically be in the range of 50% to 98% $CO_2$, with the remainder typically being water vapor and air. The incoming fermentation gas temperature would be variable but typically would be in the range of 70° F. to 90° F. Fermentation gases at higher temperatures can be treated by the carbon capture plant but would most likely benefit from the addition of a source gas cooler process step. That embodiment would generate approximately 12 lbs. of product fertilizer per cubic foot of fermentation gas treated when the fermentation gas contains approximately 98% $CO_2$ and the carbon capture plant removes 90% of the $CO_2$.

Certain embodiments of the invention are designed to process source gases having 5% to 20% $CO_2$. These embodiments are often associated with combustion processes. Other embodiments of the invention are designed to process source gases having 20% to substantially 100% $CO_2$. These embodiments are often associated with fermentation and other processes.

TABLE 1

Elements of the drawings

| | |
|---|---|
| 1000 | Source Gas Cooler System |
| 1002 | Source Gas Feed |
| 1010 | $CO_2$ Rich Feed Stream |
| 1012 | Source Gas Cooler Pump |
| 1014 | Source Gas Cooler Pump Discharge Line |
| 1016 | Source Gas Cooling Tower Feed Line |
| 1020 | Source Gas Cooler |
| 1022 | Source Gas Cooler Nozzles |
| 1024 | Source Gas Cooler Fill |
| 1040 | Source Gas Cooling Tower |
| 1042 | Source Gas Cooling Tower Fill |
| 1044 | Source Gas Cooling Tower Nozzles |
| 1046 | Source Gas Cooling Tower Fan Motor |
| 1048 | Source Gas Cooling Tower Fan |

TABLE 1-continued

Elements of the drawings

| | |
|---|---|
| 1049 | Cooling Tower Exhaust |
| 1050 | Feed Line To $CO_2$ Capture System |
| 1060 | Source Gas Cooler Recirculation Pump |
| 1062 | Source Gas Cooler Recirculation Pump Discharge Line |
| 1064 | Source Gas Cooler Make Up Water Line |
| 1080 | Source Gas Cooling Tower Blow-Down Line |
| 2000 | $CO_2$ Capture System |
| 2010 | Carbon Capture Spray Tower |
| 2012 | Carbon Capture Spray Tower Nozzles |
| 2014 | Carbon Capture Spray Tower Gas Discharge |
| 2016 | Spray Tower Liquid Discharge |
| 2020 | Carbon Capture Spray Tower Pump |
| 2022 | Carbon Capture Spray Tower Pump Discharge |
| 2024 | Carbon Capture Centrifuge Feed Line |
| 2030 | Carbon Capture Centrifuge |
| 2032 | Carbon Capture Centrifuge Slurry Discharge |
| 2034 | Carbon Capture Centrifuge Centrate Discharge |
| 2050 | Carbon Capture Centrate Tank |
| 2060 | Carbon Capture Spray Tower Cooler Feed Pump |
| 2062 | Carbon Capture Spray Tower Cooler Feed Pump Discharge Line |
| 2064 | Carbon Capture Spray Tower Ammonia Makeup Line |
| 2070 | Carbon Capture Spray Tower Cooler |
| 2072 | Spray Tower Cooler Chill Water |
| 2074 | Spray Tower Cooler Water Return |
| 2076 | Carbon Capture Spray Tower Cooler Liquid Feed Line |
| 2110 | Bubble Cap Absorber |
| 2112 | Bubble Cap Absorber Nozzles |
| 2114 | Bubble Cap Trays |
| 2116 | Bubble Cap Tower Liquid Discharge |
| 2118 | Bubble Cap Tower Gas Discharge |
| 2130 | Bubble Cap Tower Recycle Pump |
| 2132 | Bubble Cap Tower Recycle Pump Discharge Line |
| 2134 | Bubble Cap Tower Liquid Recycle To Spray Tower |
| 2136 | Bubble Cap Tower Ammonia Makeup Line |
| 2150 | Bubble Cap Tower Cooler |
| 2152 | Bubble Cap Tower Cooler Chill Water Supply |
| 2154 | Bubble Cap Tower Cooler Water Return |
| 2156 | Bubble Cap Tower Liquid Feed Line |
| 2210 | Carbon Capture Packed Tower |
| 2212 | Carbon Capture Packed Tower Nozzles |
| 2214 | Carbon Capture Packed Tower Fill |
| 2216 | Carbon Capture Packed Tower Liquid Discharge |
| 2218 | Carbon Capture Packed Tower Gas Discharge |
| 2220 | Carbon Capture Packed Tower Pump |
| 2222 | Carbon Capture Packed Tower Pump Discharge |
| 2224 | Carbon Capture Packed Tower Recycle To Bubble Cap Tower |
| 2226 | Carbon Capture Packed Tower Ammonia Makeup Line |
| 2230 | Carbon Capture Packed Tower Cooler |
| 2232 | Carbon Capture Packed Tower Cooler Chill Water Supply |
| 2234 | Carbon Capture Packed Tower Cooler Water Return |
| 2236 | Carbon Capture Packed Tower Liquid Feed Line |
| 2250 | Ammonia Supply Line |
| 3000 | Ammonia Recovery System |
| 3010 | Wash Water Ammonia Absorber |
| 3012 | Wash Water Ammonia Absorber Bottom Nozzles |
| 3014 | Wash Water Ammonia Absorber Bottom Fill |
| 3016 | Wash Water Ammonia Absorber Nozzles From Wash Water Tank |
| 3018 | Wash Water Ammonia Absorber Nozzles Supplied From the Stripper |
| 3020 | Wash Water Ammonia Absorber Intermediate Drain Line |
| 3022 | Wash Water Ammonia Absorber Top Fill |
| 3024 | Wash Water Ammonia Absorber Exhaust Line |
| 3026 | Wash Water Ammonia Absorber Exhaust Fan |
| 3027 | Line To Source Gas Exhaust Stack |
| 3030 | Wash Water Ammonia Absorber Recycle Pump |
| 3032 | Wash Water Ammonia Absorber Recycle Pump Discharge Line |
| 3034 | Wash Water Discharge To Stripper |
| 3040 | Water Wash Tank |
| 3042 | Water Wash Tank Pump |
| 3044 | Water Wash Tank Pump Discharge Line |
| 3046 | Water Wash Tank Water Supply Line |
| 3050 | Wash Water Cooler |
| 3052 | Wash Water Cooler Chill Water Supply Line |
| 3054 | Wash Water Cooler Water Return |
| 3056 | Wash Water Cooler Wash Water Return Line |
| 3060 | Stripper Heat Exchanger |
| 3062 | Stripper Wash Water Feed Line |
| 3064 | Ammonia Lean Stripper Heat Exchanger Discharge Line |

TABLE 1-continued

Elements of the drawings

| | |
|---|---|
| 3070 | Stripper Effluent Cooler |
| 3072 | Stripper Effluent Cooler Chill Water |
| 3074 | Stripper Effluent Cooler Water Return Line |
| 3076 | Cooled Stripper Effluent Return Line |
| 3080 | Stripper |
| 3082 | Stripper Fill |
| 3084 | Stripper Reboiler |
| 3086 | Stripper Gas Effluent Line |
| 3090 | Stripper Pump |
| 3092 | Stripper Pump Discharge Line |
| 3100 | Ammonia Recovery Absorber |
| 3102 | Ammonia Recovery Absorber Top Nozzles |
| 3104 | Ammonia Recovery Absorber Top Fill |
| 3106 | Ammonia Recovery Absorber Intermediate Discharge |
| 3108 | Ammonia Recovery Absorber Intermediate Discharge Line |
| 3110 | Ammonia Recovery Absorber Intermediate Nozzles |
| 3112 | Ammonia Recovery Absorber Bottom Fill |
| 3114 | Ammonia Recovery Absorber Bottom Discharge |
| 3116 | Stripper Exhaust Fan |
| 3118 | Stripper Exhaust Line |
| 3120 | Ammonia Recovery Absorber Pump |
| 3122 | Ammonia Recovery Absorber Pump Discharge Line |
| 3130 | Ammonia Recovery Absorber Cooler |
| 3132 | Ammonia Recovery Absorber Cooler Feed Line |
| 3134 | Ammonia Recovery Absorber Cooler Discharge |
| 3136 | Ammonia Recovery Absorber Cooler Chill Water |
| 3138 | Ammonia Recovery Absorber Cooler Water Return Line |
| 3140 | Ammonia Recovery Absorber Chiller Tank |
| 3150 | Ammonia Recovery Absorber Chiller Tank Pump |
| 3152 | Ammonia Recovery Absorber Chiller Tank Pump Hot Recycle Stream |
| 3160 | Ammonia Recovery Absorber Chiller |
| 3162 | Ammonia Recovery Absorber Chiller Feed Line |
| 3164 | Ammonia Recovery Absorber Chiller Effluent Line |
| 3166 | Ammonia Recovery Absorber Chiller Chill Water Supply Line |
| 3168 | Ammonia Recovery Absorber Chiller Water Return Line |
| 4000 | Slurry Dewatering And Drying System |
| 4010 | Dewatering Centrifuge Feed Tank |
| 4012 | Dewatering Centrifuge Feed Tank Impeller |
| 4014 | Dewatering Centrifuge Feed Tank Impeller Motor |
| 4016 | Dewatering Centrifuge Feed Tank Pump |
| 4018 | Dewatering Primary Centrifuge Feed Line |
| 4030 | Dewatering Primary Centrifuge |
| 4032 | Dewatering Primary Centrifuge Motor |
| 4034 | Dewatering Primary Centrifuge Air Purge Line |
| 4036 | Dewatering Primary Centrifuge Solids Discharge Line |
| 4038 | Dewatering Primary Centrifuge Centrate Discharge Line |
| 4040 | Dewatering Primary Centrifuge Solids Discharge Screw Conveyor |
| 4046 | Dewatering Secondary Centrifuge Feed Line |
| 4060 | Dewatering Secondary Centrifuge |
| 4062 | Dewatering Secondary Centrifuge Alcohol Injection Nozzles |
| 4064 | Dewatering Secondary Centrifuge Motor |
| 4066 | Dewatering Secondary Centrifuge Air Purge Line |
| 4068 | Dewatering Secondary Centrifuge Centrate Line |
| 4080 | Dewatering Secondary Centrifuge Solids Discharge Screw Conveyor |
| 4086 | Dryer Feed Line |
| 4100 | Dryer |
| 4102 | Dryer Steam Feed Line |
| 4104 | Dryer Steam Condensate Return |
| 4106 | Dryer Discharge Line |
| 4120 | Dryer Blower |
| 4122 | Dryer Moist Air Discharge |
| 4124 | Dryer Blower Discharge |
| 4130 | Primary Desiccant Drier |
| 4132 | Primary Desiccant Drier Hot Dry Air Inlet |
| 4140 | Secondary Desiccant Drier |
| 4142 | Secondary Desiccant Drier Hot Dry Air Inlet |
| 4150 | Dryer Dry Air Inlet |
| 4152 | Desiccant Dryer Regeneration Discharge Line |
| 4160 | Dryer Vent Fan |
| 4170 | Dryer Vent Condenser |
| 4172 | Dryer Vent Condenser Vent To Atmosphere |
| 4174 | Dryer Vent Condenser Chill Water Supply |
| 4176 | Dryer Vent Condenser Chill Water Return |
| 4178 | Dryer Vent Condenser Condensate Line |
| 4190 | Dewatering Secondary Centrifuge Centrate Tank |
| 4192 | Dewatering Secondary Centrifuge Centrate Tank Pump |
| 4194 | Dewatering Secondary Centrifuge Centrate Tank Pump Discharge Line |
| 4200 | Dewatering Stripper Heat Exchanger |
| 4202 | Dewatering Stripper Feed |
| 4204 | Cooled Dewatering Stripper Liquid Effluent Line |
| 4220 | Dewatering Stripper |
| 4222 | Dewatering Stripper Fill |
| 4224 | Dewatering Stripper Reboiler |
| 4226 | Dewatering Stripper Reboiler Steam Supply Line |
| 4228 | Dewatering Stripper Gas Effluent Line |
| 4230 | Dewatering Stripper Pump |
| 4232 | Dewatering Stripper Pump Effluent Line |
| 4240 | Cooler For Alcohol Stripped Centrate |
| 4242 | Cooled Stripped Centrate Line |
| 4244 | Chill Water Supply Line For Cooler For Alcohol Stripped Centrate |
| 4246 | Chill Water Return Line For Cooler For Alcohol Stripped Centrate |
| 4250 | Dewatering Primary Stripper Centrate Tank |
| 4260 | Dewatering Primary Stripper Centrate Tank Pump |
| 4262 | Dewatering Primary Stripper Centrate Tank Pump Discharge Line |
| 4280 | Dewatering Alcohol Condenser Cooler |
| 4282 | Dewatering Alcohol Condenser Cooler Effluent Line |
| 4284 | Dewatering Alcohol Condenser Cooler Chill Water Supply Line |
| 4286 | Dewatering Alcohol Condenser Cooler Chill Water Return Line |
| 4290 | Alcohol Collection Tank |
| 4292 | Alcohol Collection Tank Pump |
| 4294 | Alcohol Collection Tank Pump Discharge Line |
| 4300 | Alcohol Storage Tank |
| 4302 | Alcohol Storage Tank Pump |
| 4304 | Alcohol Storage Tank Pump Discharge Line |
| 5000 | Product Coating And Packaging System |
| 5010 | Product Coating And Packaging System Feed Conveyor |
| 5012 | Product Coating And Packaging System Feed Conveyor Motor |
| 5020 | ABC Pneumatic Conveyor Feed Hopper |
| 5022 | ABC Pneumatic Conveyor Feed Rotary Feed Valve |
| 5030 | ABC Pneumatic Conveyor Blower |
| 5040 | ABC Pneumatic Conveyor Beginning |
| 5042 | ABC Pneumatic Conveying Line |
| 5048 | Packaging ABC Solids Separator |
| 5050 | ABC Silo |
| 5052 | Packaging ABC Fines Line To Fabric Filter |
| 5054 | ABC Silo Tapered Region |
| 5055 | ABC Silo Vibrator |
| 5056 | ABC Silo Vibrator Motor |
| 5058 | ABC Silo Discharge Rotary Feeder |
| 5060 | ABC Silo Discharge Rotary Feeder Motor |
| 5070 | Pug Mill Mixer ABC Feed Line |
| 5080 | ABC Fabric Filter |
| 5082 | ABC Fabric Filter Tapered Discharge |
| 5084 | ABC Fabric Filter Screw Conveyor |
| 5086 | ABC Fabric Filter Screw Conveyor Motor |
| 5088 | ABC Fabric Filter Screw Conveyor Discharge Line To Pneumatic Conveyor Feed Hopper |
| 5090 | ABC Fabric Filter Clean Air Discharge |
| 5100 | Urea Tank |
| 5101 | Urea Supply Line |
| 5102 | Urea Tank Impeller |
| 5104 | Urea Tank Impeller Motor |
| 5108 | Urea Silo Rotary Feeder |
| 5110 | Packaging Feed Screw Conveyor |
| 5112 | Packaging Feed Screw Conveyor Motor |
| 5114 | Alcohol Supply Line |
| 5120 | Urea Feed Pump |
| 5124 | Urea Feed Line For Pug Mill Mixer |
| 5140 | Pug Mill Mixer |
| 5142 | Pug Mill Mixer Discharge Line |
| 5150 | Product Pneumatic Conveyance Line Blower |
| 5152 | Product Pneumatic Conveyance Line |
| 5160 | Product Silo |
| 5162 | Tapered Portion Of Product Silo |
| 5163 | Product Silo Vibrator |
| 5164 | Product Silo Vibrator Motor |
| 5166 | Product Silo Rotary Feeder |
| 5168 | Product Silo Rotary Feeder Motor |
| 5170 | Packaging Station |
| 5180 | Delivery System |
| 6000 | Wastewater Treatment System |
| 6010 | Wastewater Storage Tank |
| 6012 | Wastewater Storage Tank Pump |

TABLE 1-continued

Elements of the drawings

| | |
|---|---|
| 6014 | Wastewater Storage Tank Pump Discharge Line |
| 6020 | Air Bubbler Oxidizer |
| 6022 | Air Bubbler Oxidizer Blower |
| 6024 | Air Bubbler Oxidizer Nozzles |
| 6026 | Air Bubbler Oxidizer Exhaust Line |
| 6028 | Air Bubbler Oxidizer Liquid Discharge Line |
| 6040 | Wastewater Treatment First Mixing Vessel |
| 6042 | Wastewater Treatment First Mixing Vessel Impeller |
| 6050 | Wastewater Treatment Second Mixing Vessel |
| 6052 | Wastewater Treatment Second Mixing Vessel Impeller |
| 6060 | Wastewater Treatment Third Mixing Vessel |
| 6062 | Wastewater Treatment Third Mixing Vessel Impeller |
| 6070 | Wastewater Treatment Third Mixing Vessel Discharge Line |
| 6080 | Wastewater Treatment Inclined Plane Clarifier |
| 6082 | Wastewater Treatment Inclined Plane Clarifier Discharge |
| 6090 | Wastewater Treatment Inclined Plane Clarifier Pump |
| 6092 | Wastewater Treatment Inclined Plane Clarifier Pump Discharge Line |
| 6100 | Wastewater Treatment Filter Feed Tank |
| 6102 | Wastewater Treatment Filter Feed Tank Rake ???? |
| 6104 | Wastewater Treatment Filter Feed Tank Rake Motor ???? |
| 6120 | Wastewater Treatment Progressive Cavity Filter Feed Pump |
| 6122 | Wastewater Treatment Progressive Cavity Filter Feed Pump Motor |
| 6130 | Wastewater Treatment Progressive Cavity Filter Feed Pump Discharge Line |
| 6140 | Wastewater Treatment Plate and Frame And Frame Filter Press |
| 6142 | Wastewater Treatment Plate And Frame Filter Press Filtrate Discharge Line |
| 6160 | Filter Cake Portable Bin |
| 6162 | Filter Cake Portable Bin Disposal Travel Path |
| 6170 | Wastewater Treatment Plate And Frame Filter Press Filtrate Tank |
| 6172 | Wastewater Treatment Plate And Frame Filter Press Filtrate Pump |
| 6174 | Wastewater Treatment Plate And Frame Filter Press Filtrate Pump Discharge Line |
| 6180 | Wastewater Treatment Clarifier Overflow Tank |
| 6182 | Wastewater Treatment Clarifier Overflow Tank Pump |
| 6184 | Wastewater Treatment Clarifier Overflow Tank Pump Discharge Line |
| 6186 | Wastewater Treatment Clarifier Overflow Tank First Bag Filter |
| 6188 | Wastewater Treatment Clarifier Overflow Tank Second Bag Filter |
| 6200 | Wastewater Treatment Ion Exchange Resin Bed |
| 6202 | Wastewater Treatment Ion Exchange Resin Bed Discharge |
| 6210 | Wastewater Treatment Treated Effluent Storage Tank |
| 6220 | Wastewater Treatment Treated Effluent Storage Tank Transfer Pump |
| 6222 | Wastewater Treatment Treated Effluent Storage Tank Transfer Pump Line To Outfall |
| 6224 | Wastewater Treatment Treated Effluent Storage Tank Transfer Pump Line To Absorber System |
| 6230 | Ferric Chloride Storage Tank |
| 6232 | Ferric Chloride Storage Tank Process Water Line |
| 6234 | Ferric Chloride Supply Line |
| 6236 | Ferric Chloride Storage Tank Impeller |
| 6238 | Ferric Chloride Storage Tank Impeller Motor |
| 6240 | Ferric Chloride Metering Pump |
| 6242 | Ferric Chloride Metering Pump Discharge Line |
| 6260 | Lime Slurry Tank |
| 6262 | Lime Slurry Tank Water Supply Line |
| 6264 | Lime Supply Line |
| 6268 | Lime Slurry Tank Impeller |
| 6269 | Lime Slurry Tank Impeller Motor |
| 6270 | Lime Slurry Metering Pump |
| 6290 | Polymer Drum |
| 6292 | Polymer Drum Discharge |
| 6294 | Polymer Dilution Water Line |
| 6296 | Polymer Solution In-line Mixer |
| 6298 | Polymer Metering Pump |
| 6410 | Miscellaneous Process Waste Line |

References to percentages herein are to weight percentages unless otherwise indicated.

As used herein, the term "stabilizing agent" refers to the group of compositions that when applied to ammonium bicarbonate decreases the rate of decomposition of that ammonium bicarbonate. Urea is an example of such a stabilizing agent. As used herein, alcohols capable of producing a fully dissolved 50%/50% solution by weight of alcohol in water at atmospheric pressure and 25° C. should be considered water soluble. As used herein, the phrases "solids rich fraction" and "solids lean fraction" are relative terms used to compare compositions to the compositions from which they were derived. As used herein, the term "dewatering" designates a reduction in the total weight percent of water.

Any and all references to patents, documents, and other writings contained herein shall not be construed as an admission as to their status with respect to being or not being prior art. The examples, embodiments and configurations described herein are prophetic, as they have not been tested.

There are, of course, other alternate embodiments which are obvious from the foregoing descriptions of the invention, which are intended to be included within the scope of the invention, as defined by the following claims.

We claim:

1. A method of beneficially using carbon comprising: contacting carbon dioxide with an amine in a first aqueous solution; precipitating a precipitate containing a substantial number of both carbon atoms and nitrogen atoms from the first aqueous solution; separating a solids rich fraction containing at least a fraction of the precipitate containing a substantial number of both carbon atoms and nitrogen atoms from a solids lean fraction; and adding at least a portion of the solids lean fraction to the first aqueous solution; wherein the amine is ammonia; wherein the ammonia is supplied by an ammonia supply line; wherein the precipitate containing a substantial number of both carbon atoms and nitrogen atoms contains ammonium bicarbonate and ammonium carbonate; wherein a portion of the ammonia is evolved from the first aqueous solution, captured in a pollution control aqueous solution, concentrated, and returned to the first aqueous solution; contacting at least a first portion of the ammonium bicarbonate from the solids rich fraction with a water soluble alcohol and dewatering a second portion of the ammonium bicarbonate from the solids rich fraction, wherein the first portion of the ammonium bicarbonate from the solids rich fraction and the second portion of the ammonium bicarbonate from the solids rich fraction have some ammonium bicarbonate in common; wherein at a point prior to separating the solids rich fraction, the ammonium bicarbonate in the solids rich fraction is greater than 95 weight percent of the total of ammonium bicarbonate and ammonium carbonate; wherein the contacting results in absorption of carbon dioxide; and wherein substantially all of the nitrogen from the ammonia supply line and substantially all of the carbon from the carbon dioxide absorbed are converted into a solid ammonium bicarbonate product; and wherein urea is applied to the solid ammonium bicarbonate product to produce a final product.

2. A method of beneficially using carbon comprising: contacting carbon dioxide with an amine in a first aqueous solution; precipitating a precipitate containing a substantial number of both carbon atoms and nitrogen atoms from the first aqueous solution; separating a solids rich fraction containing at least a fraction of the precipitate containing a substantial number of both carbon atoms and nitrogen atoms from a solids lean fraction; and adding at least a portion of the solids lean fraction to the first aqueous solution; wherein the precipitate containing a substantial number of both carbon atoms and nitrogen atoms is contacted with a water soluble alcohol or a water soluble ketone.

3. The method of claim 2 wherein the water soluble alcohol is separated from the precipitate, treated, and used again to treat additional precipitate.

* * * * *